US 8,304,848 B2
Nov. 6, 2012

(12) United States Patent
Suzuki et al.

(10) Patent No.: US 8,304,848 B2
(45) Date of Patent: Nov. 6, 2012

(54) INFRARED IMAGING DEVICE AND METHOD OF MANUFACTURING THE SAME

(75) Inventors: Kazuhiro Suzuki, Tokyo (JP); Ikuo Fujiwara, Yokohama (JP); Keita Sasaki, Yokohama (JP); Honam Kwon, Kawasaki (JP); Hitoshi Yagi, Yokohama (JP); Hiroto Honda, Yokohama (JP); Koichi Ishii, Kawasaki (JP); Masako Ogata, Tokyo (JP); Risako Ueno, Tokyo (JP); Hideyuki Funaki, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1 day.

(21) Appl. No.: 12/883,732

(22) Filed: Sep. 16, 2010

(65) Prior Publication Data
US 2012/0007205 A1    Jan. 12, 2012

(30) Foreign Application Priority Data
Mar. 31, 2010 (JP) ................................. 2010-084327

(51) Int. Cl.
*H01L 31/00* (2006.01)
*H01L 31/04* (2006.01)
(52) U.S. Cl. ............ 257/429; 257/E31.001; 257/E31.11
(58) Field of Classification Search .......... 257/428–429, 257/E31.001, E31.11, E31.111, E31.112, 257/E31.124, E31.125
See application file for complete search history.

(56) References Cited

U.S. PATENT DOCUMENTS

| 5,409,743 | A  | * | 4/1995 | Bouffard et al. | ............. | 427/579 |
| 5,962,854 | A  | * | 10/1999 | Endo | ............................. | 250/349 |
| 6,163,061 | A  | * | 12/2000 | Iida | ................................ | 257/467 |
| 6,339,220 | B1 | * | 1/2002 | Oda | ........................... | 250/338.1 |
| 6,448,557 | B2 | * | 9/2002 | Oda | ........................... | 250/338.3 |
| 6,483,111 | B1 | * | 11/2002 | Ishikawa et al. | ........... | 250/338.4 |
| 6,504,153 | B1 | * | 1/2003 | Shigenaka et al. | ......... | 250/338.4 |
| 6,599,771 | B2 | * | 7/2003 | Mashio et al. | ................... | 438/57 |
| 6,777,680 | B2 | * | 8/2004 | Morita et al. | .............. | 250/338.1 |
| 6,777,682 | B2 | * | 8/2004 | Ishikawa et al. | ........... | 250/338.4 |
| 7,005,644 | B2 | * | 2/2006 | Ishikawa et al. | ......... | 250/339.04 |

(Continued)

FOREIGN PATENT DOCUMENTS
JP    2004-004095    1/2004
(Continued)

OTHER PUBLICATIONS
Japanese Office Action for Japanese Application No. 2010-084327 mailed on Dec. 20, 2011.

*Primary Examiner* — Jarrett Stark
*Assistant Examiner* — Michele Fan
(74) *Attorney, Agent, or Firm* — Turocy & Watson, LLP

(57) ABSTRACT

Certain embodiments provide an infrared imaging device including: an SOI structure that is placed at a distance from a substrate, and includes: heat-sensitive diodes that detect infrared rays and convert the infrared rays into heat; and STI regions that separate the heat-sensitive diodes from one another; an interlayer insulating film that is stacked on the SOI structure; and supporting legs that are connected to the heat-sensitive diodes and vertical signal lines provided in outer peripheral regions of the heat-sensitive diodes. Each of the supporting legs includes: an interconnect unit that transmit signals to the vertical signal lines; and interlayer insulating layers that sandwich the interconnect unit, each bottom side of the interlayer insulating layers being located in a higher position than the SOI structure.

6 Claims, 19 Drawing Sheets

U.S. PATENT DOCUMENTS

| | | | |
|---|---|---|---|
| 7,045,785 B2 * | 5/2006 | Iida et al. | 250/338.1 |
| 7,361,899 B2 * | 4/2008 | Iida | 250/338.4 |
| 7,598,584 B2 * | 10/2009 | Ohta et al. | 257/470 |
| 7,638,769 B2 * | 12/2009 | Honda et al. | 250/338.4 |
| 7,718,966 B2 * | 5/2010 | Ueno | 250/338.4 |
| 7,737,400 B2 * | 6/2010 | Funaki et al. | 250/338.4 |
| 7,888,762 B2 * | 2/2011 | Abe | 257/459 |
| 7,911,015 B2 * | 3/2011 | Sugino | 257/431 |
| 2001/0010360 A1 * | 8/2001 | Oda | 250/338.1 |
| 2001/0028035 A1 * | 10/2001 | Iida et al. | 250/338.4 |
| 2002/0039838 A1 * | 4/2002 | Iida et al. | 438/689 |
| 2002/0139933 A1 * | 10/2002 | Iida et al. | 250/338.1 |
| 2003/0057372 A1 * | 3/2003 | Iida et al. | 250/338.4 |
| 2004/0089807 A1 * | 5/2004 | Wada et al. | 250/338.1 |
| 2004/0129882 A1 * | 7/2004 | Mashio et al. | 250/338.1 |
| 2005/0224714 A1 * | 10/2005 | Akin et al. | 250/332 |
| 2007/0114416 A1 * | 5/2007 | Ohta et al. | 250/338.4 |
| 2007/0145274 A1 * | 6/2007 | Iida | 250/338.4 |
| 2007/0170361 A1 | 7/2007 | Honda et al. | |
| 2009/0146059 A1 * | 6/2009 | Nakaki | 250/338.4 |
| 2009/0184246 A1 * | 7/2009 | Abe | 250/338.4 |
| 2009/0236526 A1 * | 9/2009 | Sasaki et al. | 250/338.4 |
| 2009/0266987 A1 * | 10/2009 | Honda et al. | 250/338.4 |
| 2009/0275166 A1 * | 11/2009 | Iinuma | 438/72 |
| 2009/0314941 A1 * | 12/2009 | Inomata | 250/338.4 |
| 2009/0321641 A1 * | 12/2009 | Park et al. | 250/338.4 |
| 2010/0025584 A1 * | 2/2010 | Sasaki et al. | 250/338.4 |
| 2011/0248374 A1 * | 10/2011 | Akin et al. | 257/470 |
| 2012/0061569 A1 * | 3/2012 | Noguchi | 250/338.3 |

FOREIGN PATENT DOCUMENTS

| | | |
|---|---|---|
| JP | 2006162470 | 6/2006 |
| JP | 2007178323 | 7/2007 |
| JP | 2010219186 A * | 9/2010 |

* cited by examiner

INFRARED IMAGING DEVICE AND METHOD OF MANUFACTURING THE SAME

CROSS-REFERENCE TO RELATED APPLICATION

This application is based upon and claims the benefit of priority from prior Japanese Patent Application No. 2010-84327 filed on Mar. 31, 2010 in Japan, the entire contents of which are incorporated herein by reference.

FIELD

Embodiments described herein relate to an infrared imaging device and a method of manufacturing the infrared imaging device.

BACKGROUND

An infrared sensor of a non-cooling type (a thermal type) is a device that has an infrared sensing unit absorbing collected infrared rays, and converts the energy of radiation into electrical signals. Such a device characteristically has the infrared ray absorber and the detector cell with a thermoelectric converting element thermally isolated from the outside environment. To realize such a structure, a surface microstructure or a bulk microstructure forming technique is required. Unlike an infrared sensor of a cooling type that is expensive and requires a large-size cooler, an infrared sensor of a non-cooling type is inexpensive and can be advantageously made smaller.

To achieve thermal isolation, it is essential to set the detector cell in a vacuum, and lower the heat conductance of the supporting structure that physically and electrically connects the detector cell and a substrate. The heat conductance of the supporting structure becomes lower, as the size of the supporting structure becomes smaller. Therefore, the sensitivity of the sensor can be made higher by relaxing the design rules in the process to form the above structure.

As a conventional art, a robust supporting leg structure is disclosed. The supporting leg structure reduces strain caused by internal stress, so as to avoid the requirement for high precision in assembling when the supporting legs are made smaller to improve the heat insulation properties of the supporting legs. Also, according to a conventional technique, a titanium or titanium nitride thin film having lower heat conductance, instead of polycrystalline Si, is used as the material of the supporting leg interconnect unit. According to a conventional technique, by arching the supporting leg structure in advance, a stable process margin is provided even where the supporting legs are made smaller and thinner.

The size of the supporting leg interconnects in a miniaturization process is defined by the mask precision when the heat conductance of the supporting legs are lowered. Therefore, it is difficult to stably reduce the size to below the defined size.

DETAILED DESCRIPTION

Figure 1:
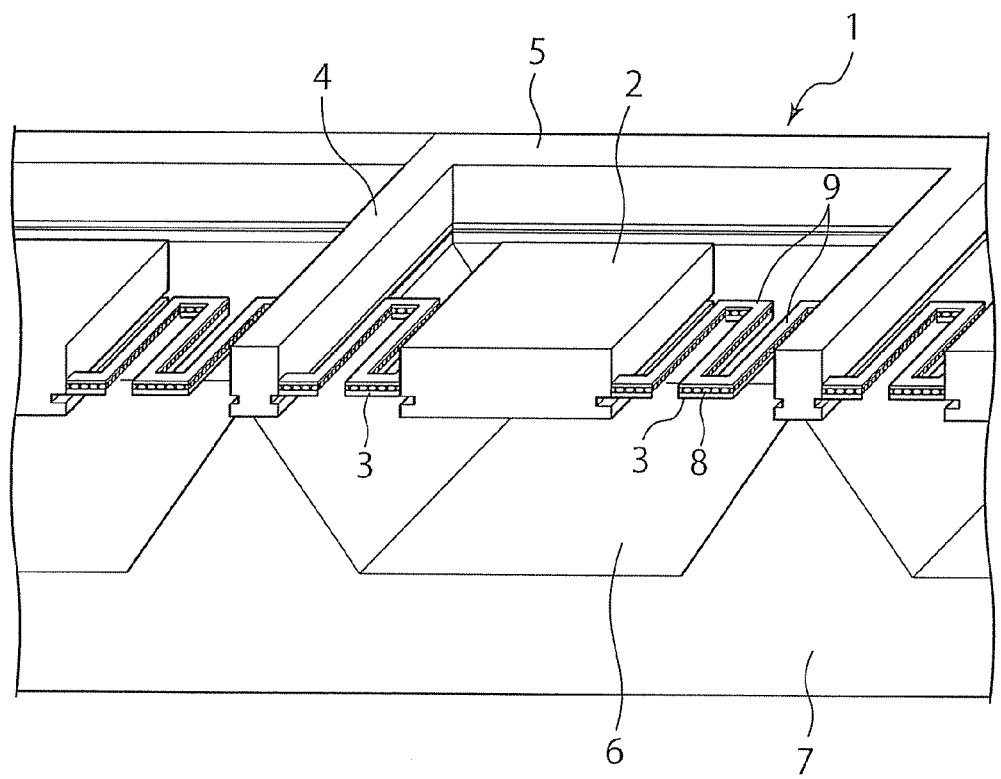
FIG. 1 is a perspective view of an infrared imaging device according to a first embodiment.

Certain embodiments provide an infrared imaging device including: an SOI structure that is placed at a distance from a substrate, and includes: heat-sensitive diodes that detect infrared rays and convert the infrared rays into heat; and STI regions that separate the heat-sensitive diodes from one another; an interlayer insulating film that is stacked on the SOI structure; and supporting legs that are connected to the heat-sensitive diodes and vertical signal lines provided in outer peripheral regions of the heat-sensitive diodes, each of the supporting legs including: an interconnect unit that transmit signals to the vertical signal lines; and interlayer insulating layers that sandwich the interconnect unit, each bottom side of the interlayer insulating layers being located in a higher position than the SOI structure.

The following is a description of embodiments of the present invention, with reference to the accompanying drawings. In the drawings, like or similar components are denoted by like or similar components.

FIG. 1 is a perspective view of an infrared imaging device according to an embodiment of the present invention. The infrared imaging device 1 is used in a wide variety of fields such as defense, surveillance cameras, and fire detecting cameras, since infrared rays characteristically have higher smoke and fog permeability than visible light. In the infrared imaging device 1 of a non-cooling type, infrared rays of 10 μm (micrometers) in wavelength are converted into heat, and a temperature change caused by the very low heat is converted into an electrical signal. By reading the electrical signal, infrared image information is obtained. The infrared imaging device 1 may be an infrared sensor that uses a silicon pn junction that converts a temperature change into a voltage change by providing a certain forward current.

As shown in FIG. 1, a heat-sensitive diode 2 that is an infrared sensing layer is placed at the center of each heat-sensitive cell forming a pixel. Supporting legs 3 that support the heat-sensitive diode 2 are connected to both ends of the heat-sensitive diode 2. The heat-sensitive diode 2 is connected to vertical signal lines 4 and horizontal signal lines 5 via the supporting legs 3. The vertical signal lines 4 and the horizontal signal lines 5 process signals supplied from the heat-sensitive diodes 2, and are located in the outer peripheral areas.

Specifically, the vertical signal lines 4 in the outer peripheral areas are connected to one end of each of the heat-sensitive diodes 2 aligned in the horizontal direction. The horizontal signal lines 5 in the outer peripheral areas are connected to the other end of each of the heat-sensitive diodes 2 aligned in the vertical direction. A pn junction element having a pn junction is used as each of the heat-sensitive diode 2. Accordingly, the vertical signal lines 4 are connected to one end (the anode) of each pn junction element, and the horizontal signal lines 5 are connected to the other end (the cathode) of each pn junction element.

A hollow portion 6 is formed between a silicon substrate 7 and the lower portions of the heat-sensitive diodes 2 and the supporting legs 3, so that the thermal components of infrared rays detected by the heat-sensitive diodes 2 does not stay inside the silicon substrate 7, and the thermal capacity is made smaller.

Further, electric interconnects 8 that are sandwiched by interlayer insulating films 9 and have a low heat conductance are provided inside the supporting legs 3 supporting the heat-sensitive diodes 2. Further, the electric interconnects 8 are placed slightly inside the sidewalls of the above mentioned interlayer insulating films 9.

The electric interconnects 8 in the supporting legs 3 are electrically connected to the vertical signal lines 4 and the horizontal signal lines 5. A p-n junction is formed in each heat-sensitive diode 2, and changes in forward voltage caused while a certain current is maintained are read by utilizing the temperature dependence of forward characteristics.

In this case, NETD (Noise Equivalent Temperature Difference), which is the sensitivity index of a regular infrared imaging device, is expressed as:

$$NETD(K) = \frac{\Delta T}{\left(\frac{V_{Signal}}{V_{Noise}}\right)} \quad (1)$$

Here, $\Delta T$ represents a change in temperature of an object. Accordingly, by improving the S/N ratio of signals, the sensitivity of the heat-sensitive diodes 2 can be made higher. $V_{signal}$, which is equivalent to the signal components, is expressed as:

$$V_{Signal} = PA\gamma(dV/dT) \cdot (1/Gth) \quad (2)$$

Here, P represents the irradiation infrared energy (W/m²), A represents the light receiving area (m²) of each heat-sensitive diode 2, γ represents the infrared absorption coefficient of each heat-sensitive diode 2, (dV/dT) represents the thermoelectric conversion efficiency (V/K) of each heat-sensitive diode 2, and Gth represents the heat conductance of the supporting legs 3. The heat conductance Gth of the supporting legs 3 is expressed as:

$$Gth = k(S/L) \quad (3)$$

Here, k represents the heat conduction coefficient, S represents the cross-sectional area (m²) of each supporting leg 3, and L represents the length (m) of each supporting leg 3.

Therefore, to increase $V_{signal}$ of the infrared imaging device 1, the value of Gth should preferably be made smaller. In other words, reducing the cross-sectional area of each supporting leg 3, or particularly, the cross-sectional area of each electric interconnect 8, is effective.

However, to reduce the heat capacity of each heat-sensitive diode 2 serving as an infrared sensing unit, the lower portions of the heat-sensitive diodes 2 and the supporting legs 3 are separated from the silicon substrate 7, and the hollow portion 6 having a hollow structure is formed. The supporting legs 3 not only conduct the heat from the heat-sensitive diodes 2, but also mechanically hold the heat-sensitive diodes 2 each having a hollow structure. Therefore, the mechanical strength becomes lower, if the supporting legs 3 are made thinner. In other words, there is a trade-off relationship between the reduction of the heat conductance and the strength of the device as a mechanical structure.

The patterning of the supporting legs 3 is performed by a lithography technique that is normally used for semiconductors. However, the supporting legs 3 are made thinner according to the design rules for the process.

The design rules define the minimum length in processing of LSIs, or the length of the smallest portion among the elements formed on a LSI. A structure having a minimum size of 100 nm or less can now be processed, thanks to the recent development of miniaturization techniques. In other words, the size of a device to be processed is determined by a mask size defined by the design rules.

Accordingly, when the supporting legs 3 including the electric interconnects 8 are made thinner, the minimum size is determined according to the design rules. As the sizes defined by the rules are made smaller, the process costs become higher, and it is difficult to provide inexpensive products.

First Embodiment

This embodiment is to provide a structure that reduces the cross-sectional area of each supporting leg 3 and lowers the heat conductance by reducing the thickness of each of the supporting legs 3 with high controllability.

Figure 2:
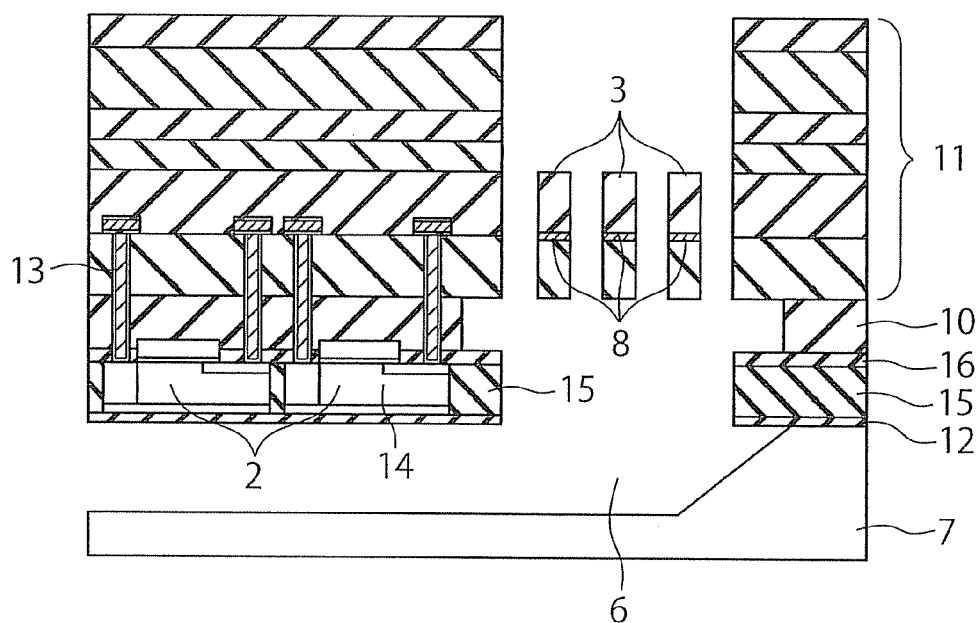
FIG. 2 is a cross-sectional view of the infrared imaging device according to the first embodiment.

FIG. 2 shows a cross-sectional structure of an infrared imaging device according to a first embodiment.

As shown in FIG. 2, the infrared imaging device 1 has a hollow structure between the silicon substrate 7 and the lower portions of the supporting legs 3 and the heat-sensitive diodes 2, and the hollow portion 6 exists in the hollow structure. The heat-sensitive diodes 2 and a BOX 12 are provided over the silicon substrate 7 via the hollow portion 6. Here, the "SOI" in a SOI 14 stands for "silicon on insulator", and the SOI 14 is a layer that includes the heat-sensitive diodes 2 and the later described STI 15.

Each heat-sensitive diode 2 has a P+-layer and an N+-layer formed by ion implantation, and functions as a diode. When infrared rays of 8 to 12 μm in wavelength are incident on the pixel array formed by the heat-sensitive diodes 2, the infrared rays are absorbed by the later described interlayer insulating films 11 placed on the heat-sensitive diodes 2 having an absorption peak in the above described wavelength band, and the temperature of the heat-sensitive diodes 2 becomes higher. In this manner, the heat-sensitive diodes 2 convert heat generated by infrared ray absorption into electrical signals.

The "BOX" of the BOX 12 stands for "Buried Oxide", and the BOX 12 is an oxide film. The BOX 12 is placed below the STI 15 and the heat-sensitive diodes 2.

The STI 15 is stacked on the BOX 12. The "STI" of the STI 15 stands for "Shallow Trench Isolation", and the STI 15 serves to perform device separations on the heat-sensitive diodes 2 of the infrared imaging device 1.

A barrier film 16 is stacked on the STI 15. Being made of a nitride such as SiN, the barrier film 16 functions as a barrier film when oxygen etching is performed.

An interlayer insulating film 10 made of BPSG is stacked on the barrier film 16. BPSG (Boron Phosphor Silicate Glass) is used as the interlayer insulating film 10. Since the softening point temperature of BPSG is low, a flattening effect (reflow) is achieved in the growth stage. Particularly, BPSG excels in coatability, coating step-like portions such as gates, and is widely used as interlayer insulating films.

Also, as shown in FIG. 2, etching is performed on the end portions of the interlayer insulating film (BPSG) 10 through the later described etching process, so that the end portions of the interlayer insulating film (BPSG) 10 are recessed in directions away from the supporting legs 3, compared with the end portions of the BOX 12, the STI 15, the barrier film 16, and the later described interlayer insulating films (TEOS) 11.

Several layers of the interlayer insulating films (TEOS) 11 are stacked on the interlayer insulating film (BPSG) 10. Here, the "TEOS" of the interlayer insulating films (TEOS) 11 stands for Tetra Ethyl Ortho Silicate.

Further, Al interconnects 13 are provided between the heat-sensitive diodes 2 and the interlayer insulating films (TEOS) 11. The Al interconnects 13 are formed with bias extending in the vertical direction and interconnects extending in the horizontal direction. The Al interconnects 13 form contacts with the heat-sensitive diodes 2, to send electrical signals converted from the heat of infrared rays by the heat-sensitive diodes 2 to the vertical signal lines 4 and the horizontal signal lines 5 via the electric interconnects 8 in the supporting legs 3.

As can be seen from FIG. 1, the hollow portions 6 are formed on and below the upper and lower layers of the portions forming the supporting legs 3, and accordingly, the cross-sectional area of each supporting leg 3 is made smaller. Furthermore, since the end portions of the interlayer insulating film (BPSG) 10 are etched and recessed in directions away from the supporting legs 3, the interlayer insulating film that conventionally functions as a sacrifice layer remains after the etching.

Referring now to FIGS. 3A through 7C, a method of manufacturing the infrared imaging device according to the first embodiment is described.

Figure 3A:
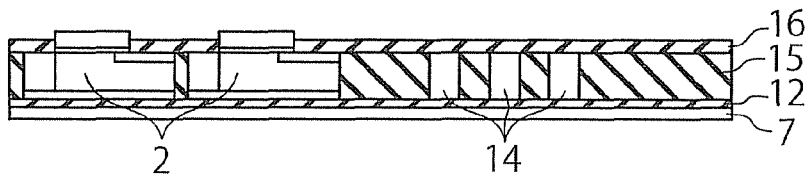
FIGS. 3A through 3E are cross-sectional views illustrating a method of manufacturing the infrared imaging device according to the first embodiment.

FIG. 3A is a cross-sectional view that is seen after a PN junction is formed on each heat-sensitive diode 2 by a general-purpose CMOS process. The BOX 12 is stacked on the Si substrate 7. The heat-sensitive diodes 2, the SOI 14, and the STI 15 are formed over the BOX 12. Further, the barrier film 16 is formed to cover the heat-sensitive diodes 2, the SOI 14, and the STI 15.

Here, the STI 15 functions to separate pixels and transistors, but is formed by the patterning performed to form the supporting legs 3. The portions corresponding to the supporting legs 3 are made of Si.

Figure 3B:
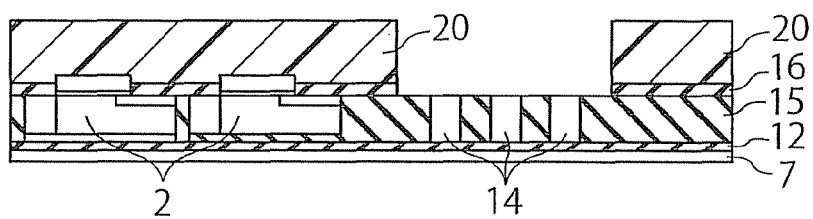

FIG. 3B illustrates the procedure for performing selective etching on the barrier film 16 such as a SiN film that protects the gates of the portions corresponding to the supporting legs 3. As shown in FIG. 3B, a resist 20 is applied to the portions other than the portions corresponding to the supporting legs 3, and etching is performed by a lithography technique, with the resist 20 serving as a mask. In this manner, the barrier film 16 is partially removed to have openings at the portions corresponding to the supporting legs 3.

Figure 3C:
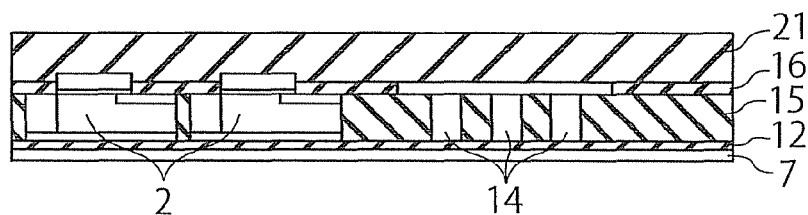

In the procedure illustrated in FIG. 3C, BPSG 21 to be an interlayer insulating film is deposited and stacked, and flattening is then performed on the surface of the BPSG 21. Here, the "BPSG" of the BPSG 21 stands for Boron Phosphor Silicate Glass. Since etching has been performed to remove the barrier film 16 at the portions corresponding to the supporting legs 3 in the procedure illustrated in FIG. 3B, the BPSG 21 has an interface with the SOI 14.

Figure 3D:
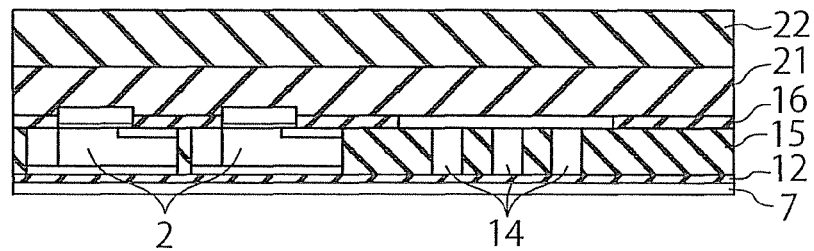

In the procedure illustrated in FIG. 3D, TEOS 22 to be a first interlayer insulating film is stacked on the BPSG 21, and flattening is then performed on the surface of the TEOS 22.

Figure 3E:
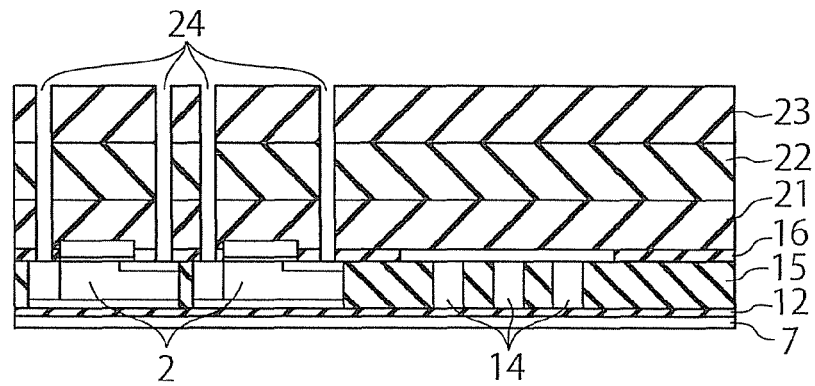

In the procedure illustrated in FIG. 3E, a resist 23 is stacked on the TEOS 22 to be the first interlayer insulating film. Etching is then performed by a lithography technique, with the resist 20 serving as a mask. In this manner, the BPSG 21, the TEOS 22, and the resist 23 are removed at the portions corresponding to the Al interconnects 13, to form contact holes 24 that are openings.

Figure 4A:
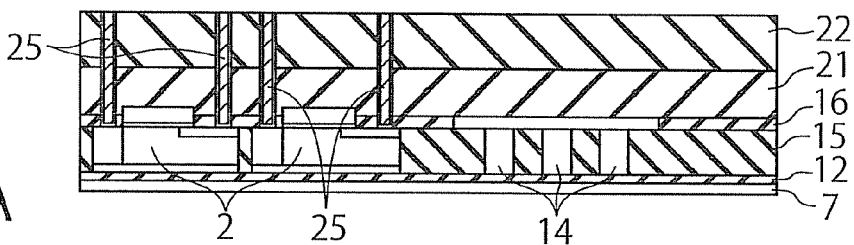
FIGS. 4A through 4D are cross-sectional views illustrating a method of manufacturing the infrared imaging device according to the first embodiment.

In the procedure illustrated in FIG. 4A, the contact holes 24 that are openings are filled to form contacts 25 (hereinafter equivalent to the Al interconnects 13). Here, Ti, TiN, W, or the like is used as the contacts 25. The contacts 25 are connecting regions that electrically connect multilayer interconnects formed on device regions, to the device regions formed on the SOI 14 by impurity implantation. The contacts 25 serve as contacts with the upper portions of the heat-sensitive diodes 2, and function to transmit electrical signals from the heat-sensitive diodes 2 to the outside.

Figure 4B:
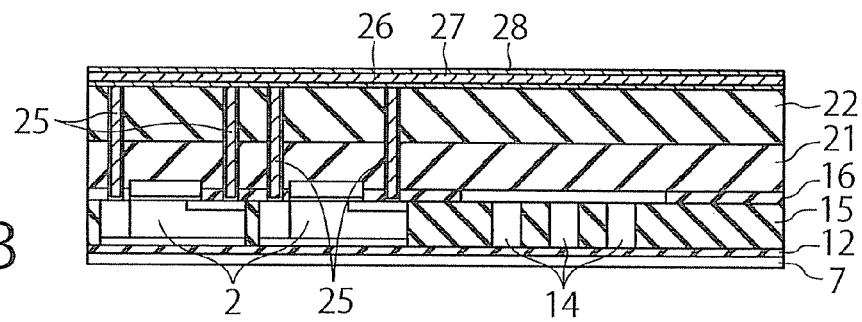

In the procedure illustrated in FIG. 4B, a lower barrier metal 26, an interconnect 27, and an upper barrier metal 28 are sequentially stacked. Here, Ti or TiN can be used as the lower barrier metal 26 and the upper barrier metal 28. Meanwhile, Al—Cu may be used as the interconnect 27.

The interconnect 27 is in electrical contact with the contacts 25, and the electrical signals from the heat-sensitive diodes 2 are transmitted to the outside via the interconnect 27.

Figure 4C:
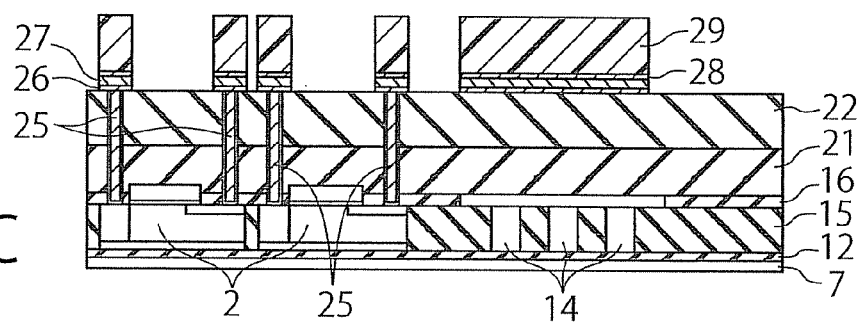

In the procedure illustrated in FIG. 4C, a resist 29 is stacked on the upper barrier metal 28, and etching is performed by a lithography technique, with the resist 29 serving as a mask. In this manner, the upper barrier metal 28, the interconnect 27, and the lower barrier metal 26 are partially removed by the etching. In the etching of the interconnect 27, a Cl-based gas or the like is used.

Figure 4D:
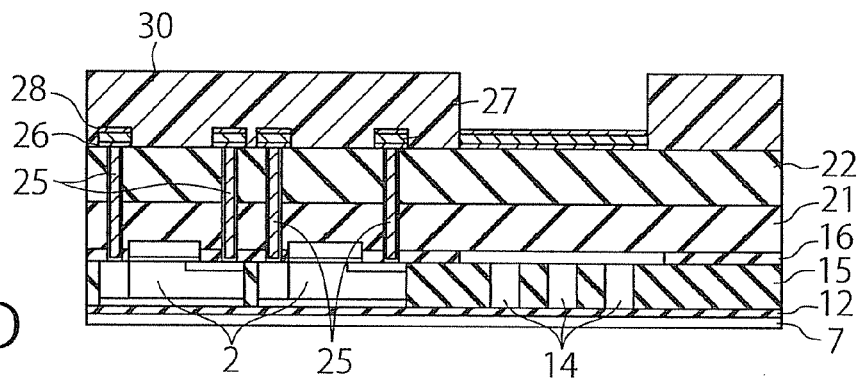

In the procedure illustrated in FIG. 4D, after the resist 29 is removed, a resist 30 is again stacked. The portions of the upper barrier metal 28, the interconnect 27, and the lower barrier metal 26 corresponding to the upper portions of the SOI 14 are exposed through the surface, so that the resist 30 is not stacked thereon.

Figure 5A:
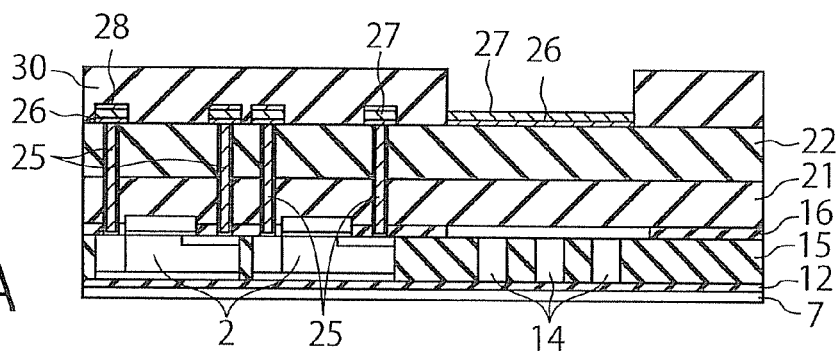
FIGS. 5A through 5D are cross-sectional views illustrating a method of manufacturing the infrared imaging device according to the first embodiment.

In the procedure illustrated in FIG. 5A, etching is performed by a lithography technique, with the resist 30 serving as a mask. In this manner, the upper barrier metal 28 is removed by the etching. However, the interconnect 27 and the lower barrier metal 26 are not etched, and still remain.

Figure 5B:
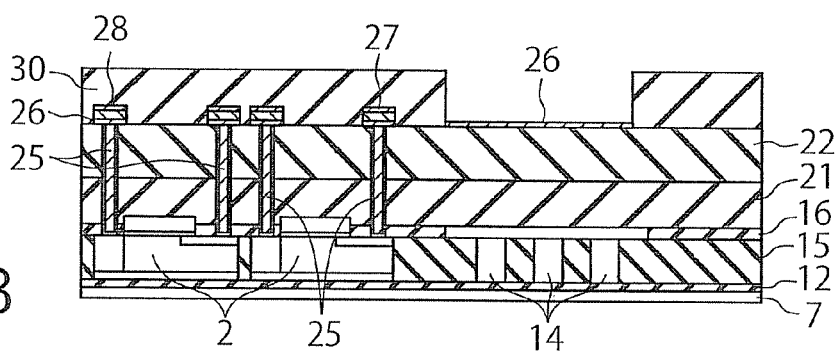

In the procedure illustrated in FIG. 5B, etching is performed by a lithography technique, with the resist 30 serving as a mask. In this manner, the interconnect 27 is removed by the etching. However, the lower barrier metal 26 is not etched, and still remains.

The procedures illustrated in FIGS. 5A and 5B are carried out to lower the heat conductance of the interconnects of the supporting legs 3. As explained in conjunction with the equation (3), the heat conductance of the supporting legs 3 can be effectively lowered by using an interconnect material having a low heat conduction coefficient, elongating the supporting legs, and reducing the cross-sectional area of each supporting leg.

In the first embodiment, the electric interconnects 8 are formed with a material having a lower heat conduction coefficient. Accordingly, by performing selective etching on the upper barrier metal 28 formed with Ti/TiN of the interconnect 27 corresponding to the interconnects of the supporting legs 3 and on the interconnect 27 under the upper barrier metal 28, the material forming the electric interconnects 8 can be formed only with the lower barrier metal 26 made of Ti/TiN. In the selective etching of the upper barrier metal 28 made of Ti/TiN, heated $H_2O_2$ (hydrogen peroxide solution) or the like can be used. In the selective etching of the interconnect 27, a mixed acid of $CH_3COOH$ (nitric acid), $HNO_3$ (acetic acid), $H_3PO_4$ (phosphoric acid), and the like can be used.

Figure 5C:
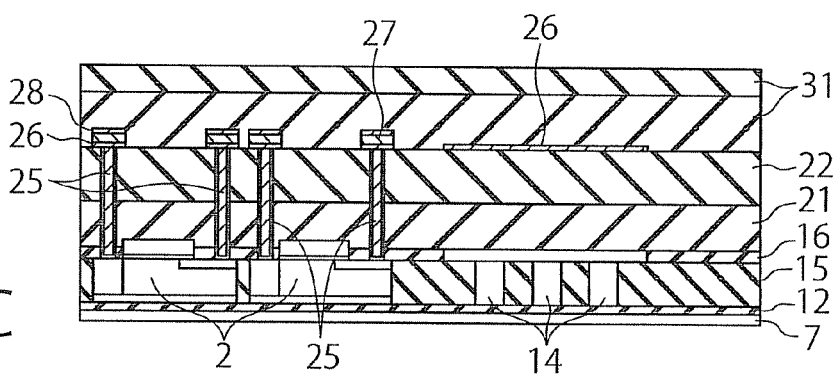

In the procedure illustrated in FIG. 5C, after the resist 30 is removed, two layers of TEOS 31 to be second interlayer insulating films are stacked. In a regular LSI, interconnects are formed with multilayers in the vertical direction, and a TEOS film made of a material conventionally used as an interlayer insulating film is formed by CVD.

Figure 5D:
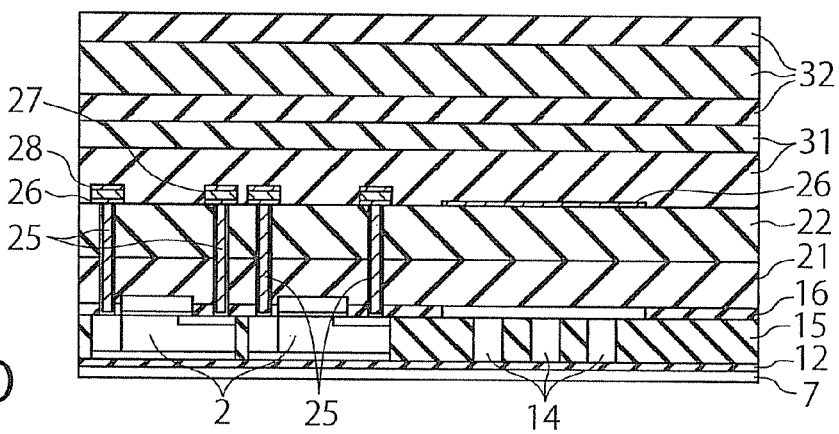

In the procedure illustrated in FIG. 5D, two layers of TEOS 32 to be second interlayer insulating films are further stacked.

Figure 6A:
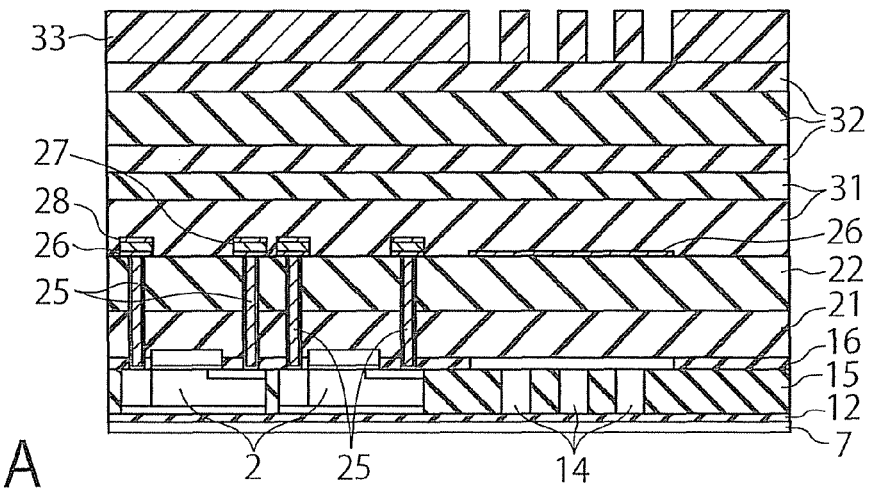
FIGS. 6A through 6C are cross-sectional views illustrating a method of manufacturing the infrared imaging device according to the first embodiment.

In the procedure illustrated in FIG. 6A, a resist 33 is applied to regions other than the regions corresponding to the supporting legs 3 by a lithography technique. By applying the resist 33 in this manner, etching can be performed on the regions corresponding to the supporting legs 3.

Figure 6B:
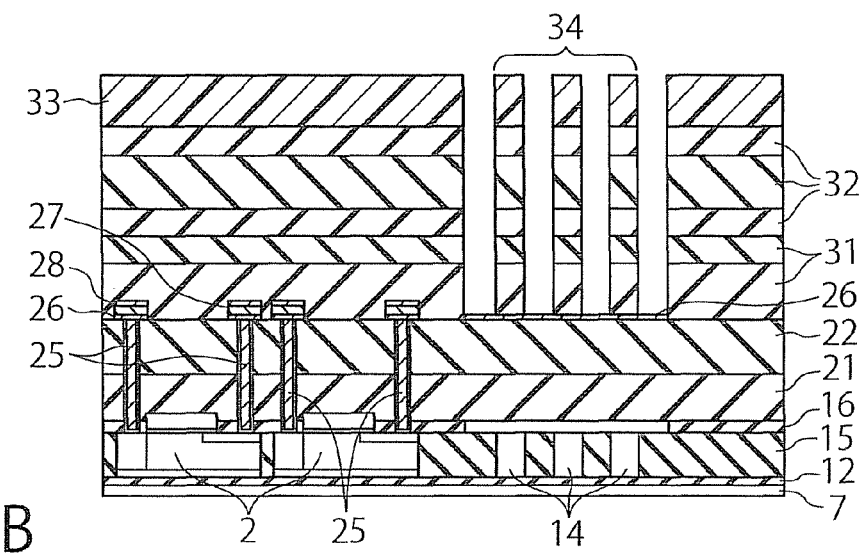

In the procedure illustrated in FIG. 6B, deep trenching is performed by RIE with the use of a lithography technique, to form deep trench openings 34. However, the etching does not reach the lower barrier metal 26 remaining on the TEOS 21 to be the first interlayer insulating film.

Figure 6C:
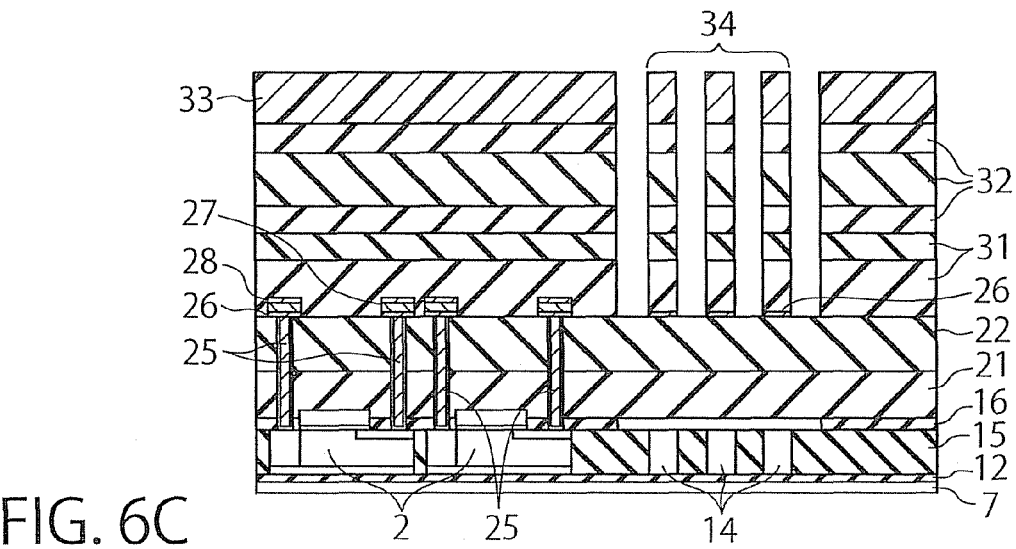

In the procedure illustrated in FIG. 6C, deep trenching by RIE is performed on the lower barrier metal 26 corresponding to the supporting legs 3. However, the etching does not reach the TEOS 21 to be the first interlayer insulating film.

Figure 7A:
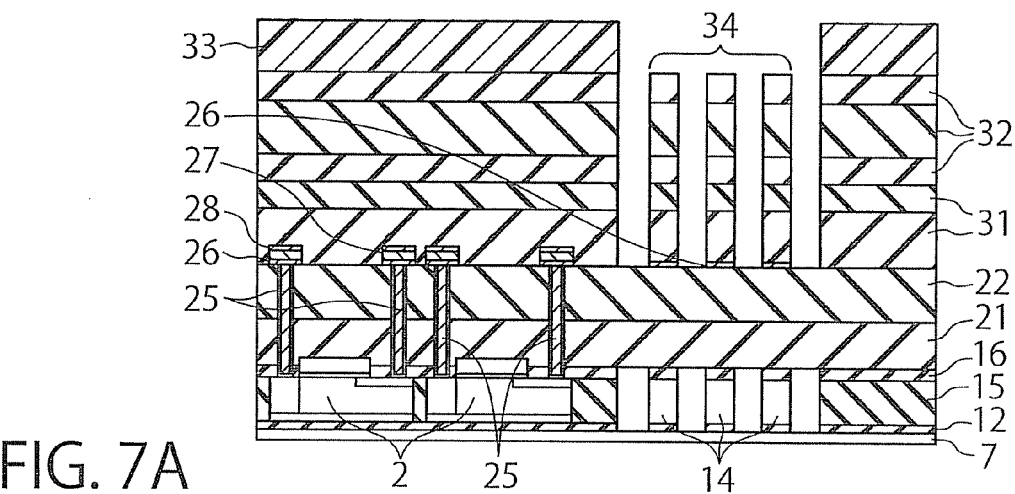
FIGS. 7A through 7C are cross-sectional views illustrating a method of manufacturing the infrared imaging device according to the first embodiment.

In the procedure illustrated in FIG. 7A, the portions of the resist 33 located over the deep trench openings 34 are removed. By removing those portions of the resist 33, etching can be performed on the regions other than the regions corresponding to the supporting legs 3.

Figure 7B:
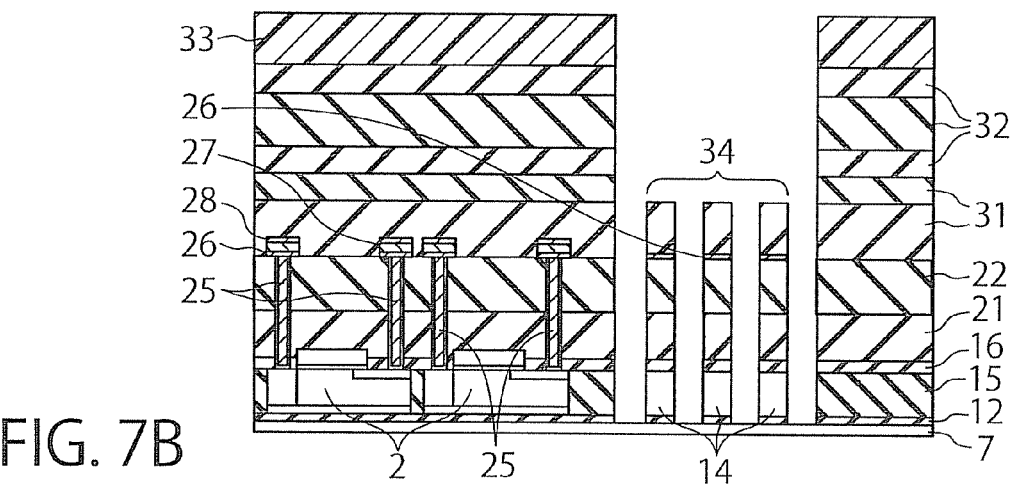

In the procedure illustrated in FIG. 7B, deep trenching by RIE is further performed by a lithography technique, with the resist 33 serving as a mask. By doing so, the deep trench openings 34 are extended to the silicon substrate 7 by the etching. The portions of the TEOS 31 and the TEOS 32 located over the deep trench openings 34 are removed by etchback.

Figure 7C:
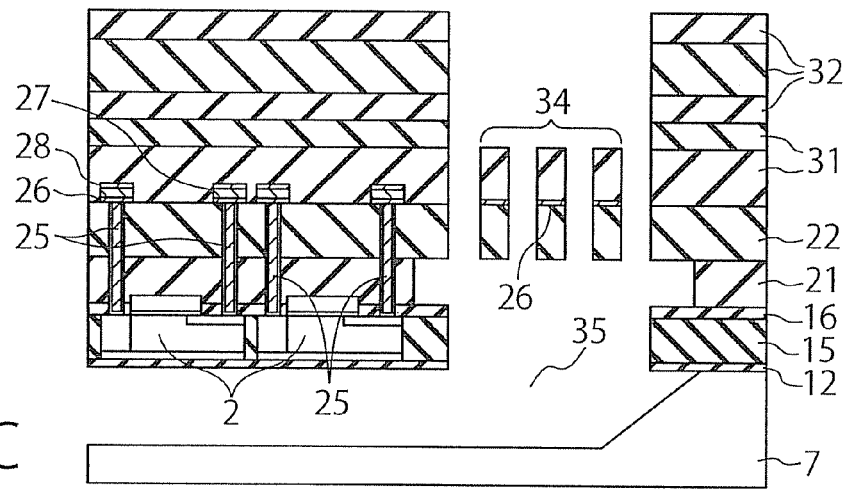

Lastly, in the procedure illustrated in FIG. 7C, a hollowing process is performed to separate the heat-sensitive diodes 2 from the silicon substrate 7. In this procedure, TMAH (Tetramethyl Ammonium Hydroxide) is used as the etching solution. TMAH is well known as an etchant for anisotropic etching to be performed on silicon. Furthermore, TMAH has low selectivity for BPSG with respect to interlayer insulating films such as TEOS films, and accordingly, can selectively remove only BPSG.

There are through holes between the supporting legs 3 in the procedure illustrated in FIG. 7B, and the TMAH moves deeper through the through holes in FIG. 7C. As a result, etching is performed on the silicon substrate 7 below the supporting legs 3, to form a hollow of an inverse-pyramid shape. Normally, TMAH has selectivity for oxide films such as the TEOS films 31 and 32. In this procedure, however, the BPSG 16 as an interlayer insulating film is etched and partially removed. As a result, the end portions of the BPSG 16 are recessed.

In this procedure, etching is also performed on the SOI 14 as the lower layer portions of the supporting legs 3. Accordingly, the BPSG 21 below the lower barrier metal 26 and the SOI 14 can be removed by etching. Through this procedure, a hollow portion is formed between the silicon substrate 7 and the heat-sensitive diodes 2 and the lower portions of the lower barrier metal 26.

Through the procedure illustrated in FIG. 7C, the lower barrier metal 26 and the TEOS 21 and the TEOS 22 serving as the upper and lower interlayer insulating films for the lower barrier metal 26 remain to form the supporting legs 3.

As described above, in the first embodiment, the procedures illustrated in FIGS. 3A through 7C are carried out to reduce the cross-sectional area of each supporting leg 3 and lower the heat conductance of each supporting leg 3. Accordingly, the heights of the supporting legs 3 can be reduced by performing etching on the TEOS films 22, 31, and 32 only at the portions corresponding to the supporting legs 3. The TEOS films 22, 31, and 32 serve as the surrounding interlayer insulating films.

Also, in the first embodiment, etchback is performed on the upper portions of the supporting legs 3, to reduce the thickness of each supporting leg 3. Accordingly, the heat conductance can be lowered.

Furthermore, in the first embodiment, the lower layer portions of the supporting legs 3 are removed. Accordingly, the cross-sectional area of each supporting leg 3 can be reduced, regardless of the process limitation of lithography.

Furthermore, in the first embodiment, only materials, that can be processed by a general-purpose CMOS process can be used in removing the lower layer portions of the supporting legs 3.

Accordingly, devices with excellent productivity can be provided, without using a specially prepared film.

Second Embodiment

The following is a description of a second embodiment.

Figure 8:
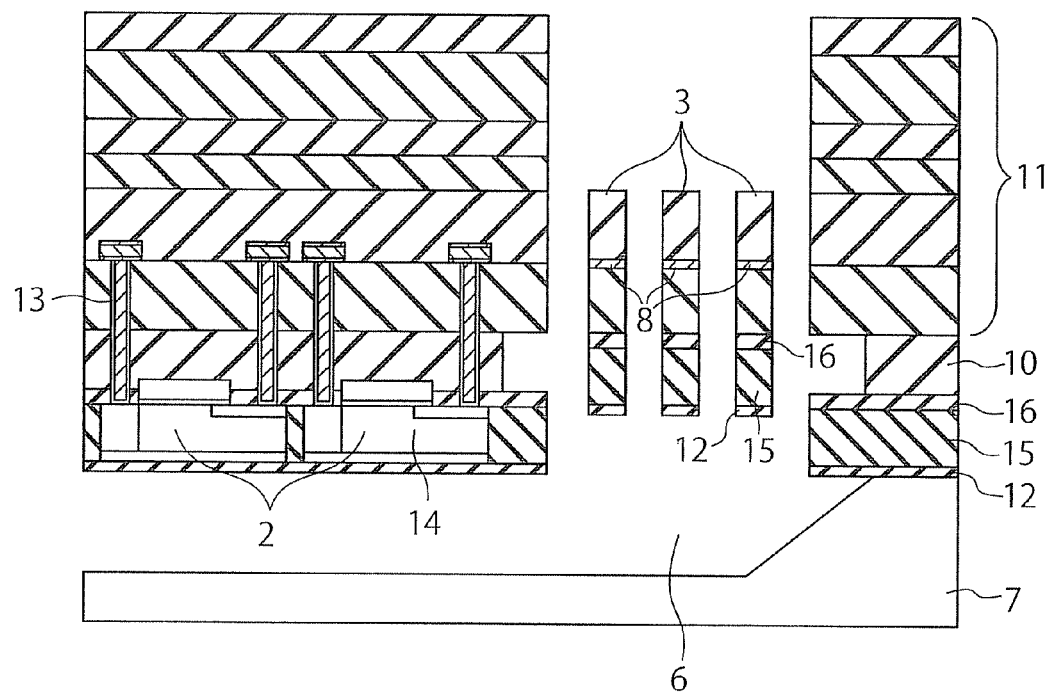
FIG. 8 is a cross-sectional view of the infrared imaging device according to a second embodiment.

FIG. 8 is a cross-sectional view of an infrared imaging device according to the second embodiment.

As shown in FIG. 8, a hollow structure is formed between the silicon substrate 7 and the lower portions of the supporting legs 3 and the heat-sensitive diodes 2, as in the first embodiment, and the hollow portion 6 exists in the hollow structure.

The heat-sensitive diodes 2, the SOI 14, and the BOX 12 are placed over the silicon substrate 7 via the hollow portion 6.

Each heat-sensitive diode 2 has a P$^+$-layer and an N$^-$-layer formed by ion implantation, and functions as a diode. The BOX 12 is placed under the STI 15 and the heat-sensitive diodes 2.

The STI 15 is stacked on the BOX 12. The barrier film 16 is stacked on the STI 15. Being made of a nitride such as SiN, the barrier film 16 functions as a barrier film when oxygen etching is performed.

An interlayer insulating film 10 made of BPSG is stacked on the barrier film 16, as in the first embodiment. Also, as in the first embodiment, by the later described etching process, the end portions of the interlayer insulating film 10 are etched and recessed in directions away from the supporting legs 3, compared with the end portions of the BOX 12, the STI 15, the barrier film 16, and the interlayer insulating films 11 made of TEOS.

Several layers of the interlayer insulating films 11 are stacked on the interlayer insulating film 10. The Al interconnects are further provided between the upper portions of the heat-sensitive diodes 2 and the interlayer insulating films 11.

As can be seen from FIG. 8, the cross-sectional area of each supporting leg 3 is reduced by providing the hollow portion 6 on and below the upper and lower layers of the portions forming the supporting legs 3. Furthermore, since the end portions of the interlayer insulating film 10 are etched and recessed in directions away from the supporting legs 3, the interlayer insulating film that conventionally functions as a sacrifice layer remains after the etching.

Furthermore, in the second embodiment, the supporting legs 3 include not only the electric interconnects 8 and the TEOS films 11 but also the BOX 12, the STI 15, and the barrier film 16. This is because, according to the later described method of manufacturing the infrared imaging device of the second embodiment, the interlayer insulating film 10 existing between the barrier film 16 and the TEOS films 11 disappears through etching, and the BOX 12, the STI 15, and the barrier film 16 adhere to the TEOS films 11 due to the drying process.

Referring now to FIGS. 9A through 14, the method of manufacturing the infrared imaging device according to the second embodiment of the present invention is described.

Figure 9A:
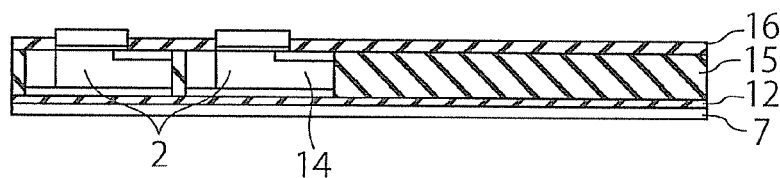
FIGS. 9A through 9E are cross-sectional views illustrating a method of manufacturing the infrared imaging device according to the second embodiment.

FIG. 9A is a cross-sectional view that is seen after a PN junction is formed on each heat-sensitive diode 2 by a general-purpose CMOS process. The BOX 12 is stacked on the Si substrate 7. The heat-sensitive diodes 2, the SOI 14, and the STI 15 are formed over the BOX 12. Further, the barrier film 16 is formed to cover the heat-sensitive diodes 2, the SOI 14, and the STI 15. Here, this embodiment differs from the first embodiment in that the SOI 14 is not formed in the regions in which the supporting legs 3 are to be formed, but the STI 15 is buried in the entire regions in which the supporting legs 3 are to be formed.

Figure 9B:
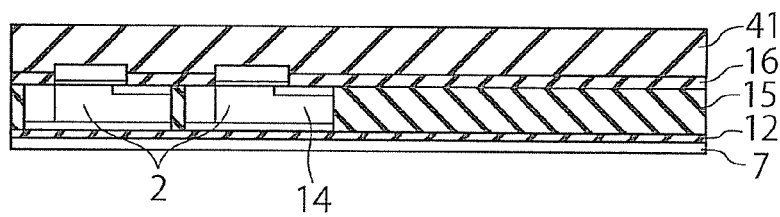

As shown in FIG. 9B, BPSG 41 to be an interlayer insulating film is applied onto the entire surface of the barrier film 16, and is turned into a film. Here, the second embodiment differs from the first embodiment in that, in the procedure for forming the BPSG film 41, openings are not formed in the barrier film 16 at the portions corresponding to the supporting legs 3 by a lithography technique.

Figure 9C:
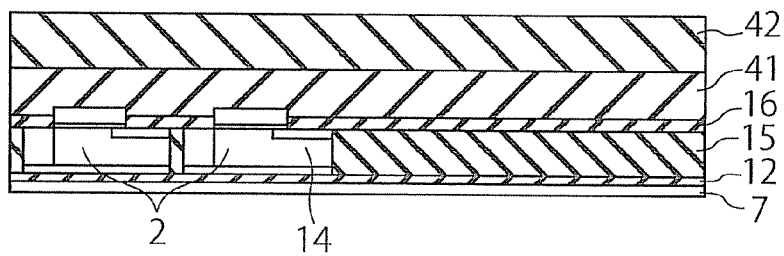

In the procedure illustrated in FIG. 9C, TEOS 42 to be a first interlayer insulating film is stacked on the BPSG 41, and flattening is performed on the surface.

Figure 9D:
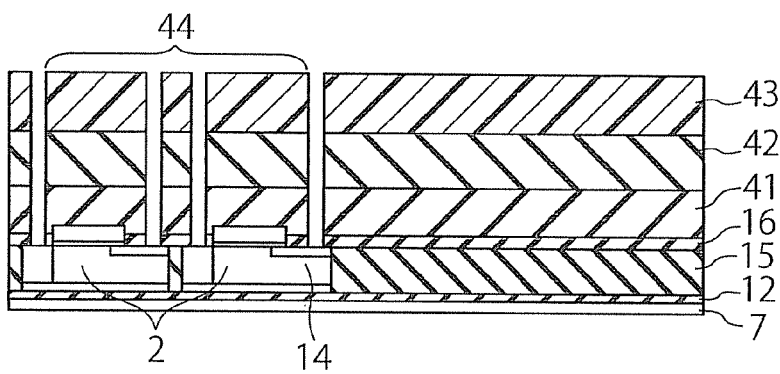

In the procedure illustrated in FIG. 9D, a resist 43 is stacked on the TEOS 42 to be the first interlayer insulating film. After that, etching is performed by a lithography technique. In this manner, the BPSG 41, the TEOS 42, and the resist 43 are removed at the portions corresponding to the Al interconnects 13, to form contact holes 44 that are openings.

Figure 9E:
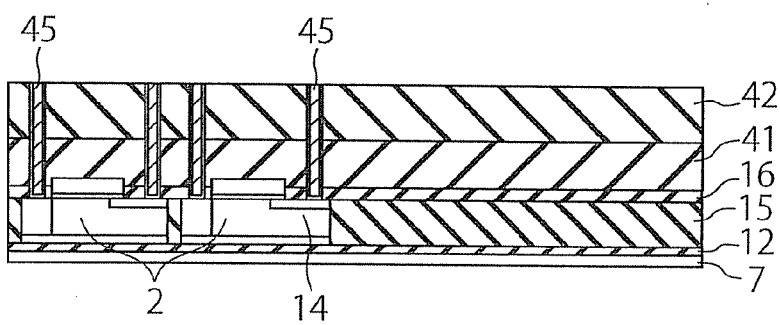

In the procedure illustrated in FIG. 9E, the contact holes 44 that are openings are filled to form contacts 45 (hereinafter equivalent to the Al interconnects 13). Here, Ti, TiN, W, or the like is used as the contacts 45, as in the first embodiment. The contacts 45 are connecting regions that electrically connect multilayer interconnects formed on device regions, to the device regions formed on the SOI 14 by impurity implantation. The contacts 45 serve as contacts with the upper portions of the heat-sensitive diodes 2, and function to transmit electrical signals from the heat-sensitive diodes 2 to the outside.

Figure 10A:
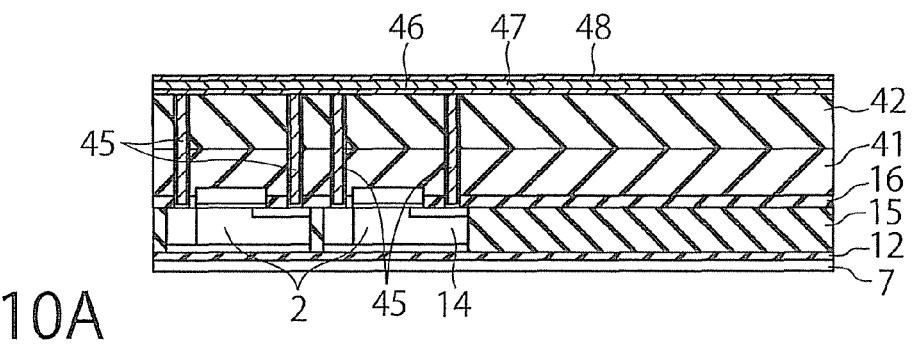
FIGS. 10A through 10D are cross-sectional views illustrating a method of manufacturing the infrared imaging device according to the second embodiment.

In the procedure illustrated in FIG. 10A, a lower barrier metal 46, an interconnect 47, and an upper barrier metal 48 are sequentially stacked. Here, Ti or TiN can be used as the lower barrier metal 46 and the upper barrier metal 48, as in the first embodiment. Meanwhile, Al—Cu may be used as the interconnect 47, as in the first embodiment.

Figure 10B:
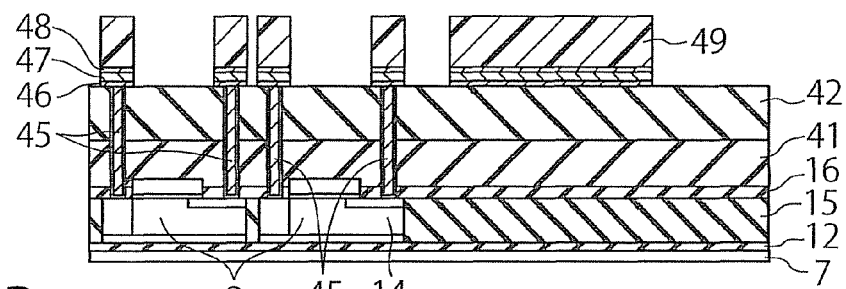

In the procedure illustrated in FIG. 10B, a resist 49 is stacked on the upper barrier metal 48, and etching is performed by a lithography technique, with the resist 49 serving as a mask. In this manner, the upper barrier metal 48, the interconnect 47, and the lower barrier metal 46 are partially removed by the etching. In the etching of the interconnect 47, a Cl-based gas or the like is used.

Figure 10C:
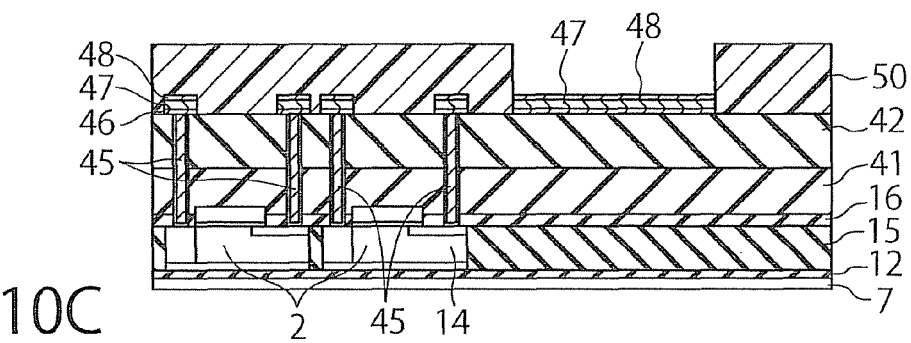

In the procedure illustrated in FIG. 10C, after the resist 49 is removed, a resist 50 is again stacked. The portions of the upper barrier metal 48, the interconnect 47, and the lower barrier metal 46 corresponding to the upper portions of the supporting legs 3 are exposed through the surface, so that the resist 50 is not stacked thereon.

Figure 10D:
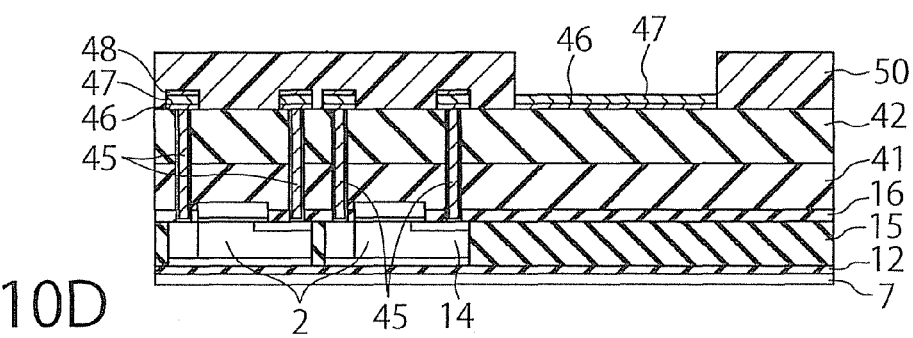

In the procedure illustrated in FIG. 10D, etching is performed by a lithography technique, with the resist 50 serving as a mask. In this manner, the upper barrier metal 48 is removed by the etching. However, the interconnect 47 and the lower barrier metal 46 are not etched, and still remain.

Figure 11A:
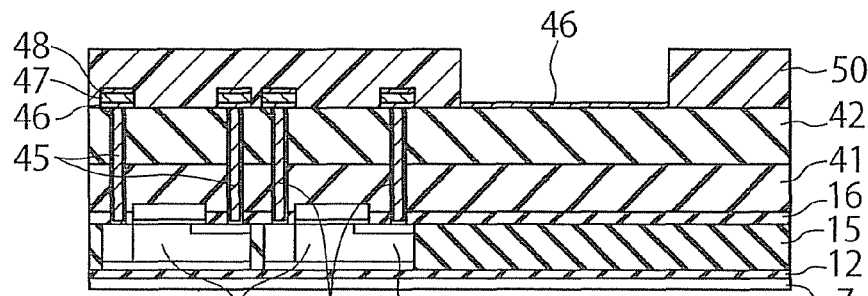
FIGS. 11A through 11C are cross-sectional views illustrating a method of manufacturing the infrared imaging device according to the second embodiment.

In the procedure illustrated in FIG. 11A, etching is performed by a lithography technique, with the resist 50 serving as a mask. In this manner, the interconnect 47 is removed by the etching. However, the lower barrier metal 46 is not etched, and still remains.

The procedures illustrated in FIGS. 10C and 11A are carried out to lower the heat conductance of the interconnects of the supporting legs 3, as in the first embodiment. As explained in conjunction with the equation (3), the heat conductance of the supporting legs 3 can be effectively lowered by using an interconnect material having a low heat conduction coefficient, elongating the supporting legs, and reducing the cross-sectional area of each supporting leg.

In the second embodiment, the electric interconnects 8 are formed with a material having a lower heat conduction coefficient Accordingly, by performing selective etching on the upper barrier metal 48 formed with Ti or TiN of the interconnect 47 corresponding to the interconnects of the supporting legs 3 and on the interconnect 47 under the upper barrier metal 48, the material forming the electric interconnects 8 can be formed only with the lower barrier metal 46. In the selective etching of the upper barrier metal 48, heated $H_2O_2$ (hydrogen peroxide solution) or the like can be used. In the selective etching of the interconnect 47, a mixed acid of $CH_3COOH$ (nitric acid), $HNO_3$ (acetic acid), and $H_3PO_4$ (phosphoric acid) can be used.

Figure 11B:
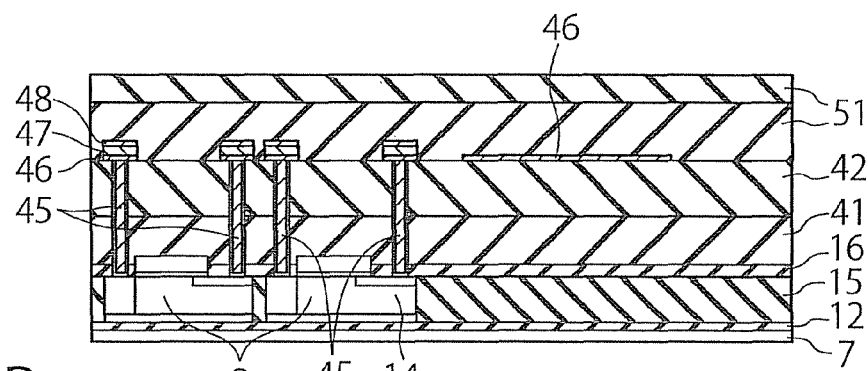

In the procedure illustrated in FIG. 11B, after the resist 50 is removed, two layers of TEOS 51 to be second interlayer insulating films are stacked.

Figure 11C:
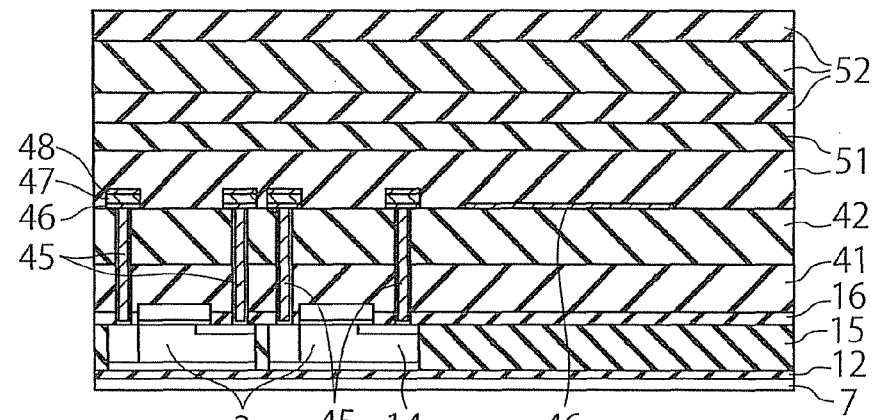

In the procedure illustrated in FIG. 11C, two layers of TEOS 52 to be second interlayer insulating films are further stacked.

Figure 12A:
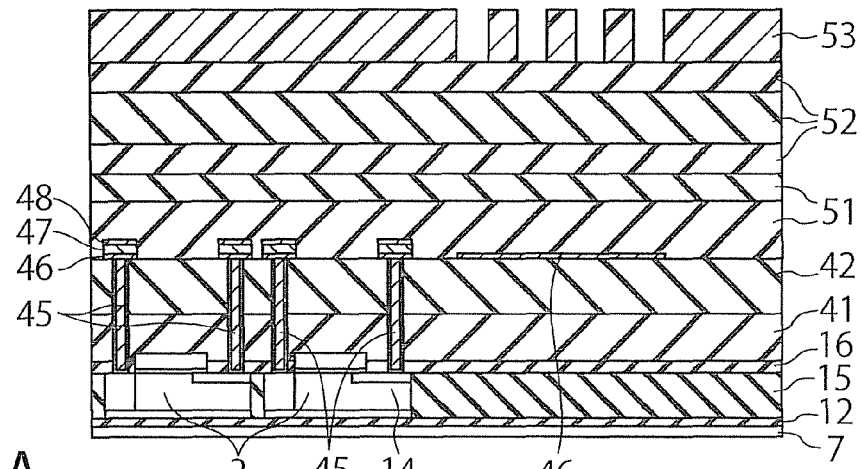
FIGS. 12A through 12C are cross-sectional views illustrating a method of manufacturing the infrared imaging device according to the second embodiment.

In the procedure illustrated in FIG. 12A, a resist 53 is applied to regions other than the regions corresponding to the supporting legs 3 by a lithography technique. By applying the resist 53 in this manner, etching can be performed on the regions corresponding to the supporting legs 3.

Figure 12B:
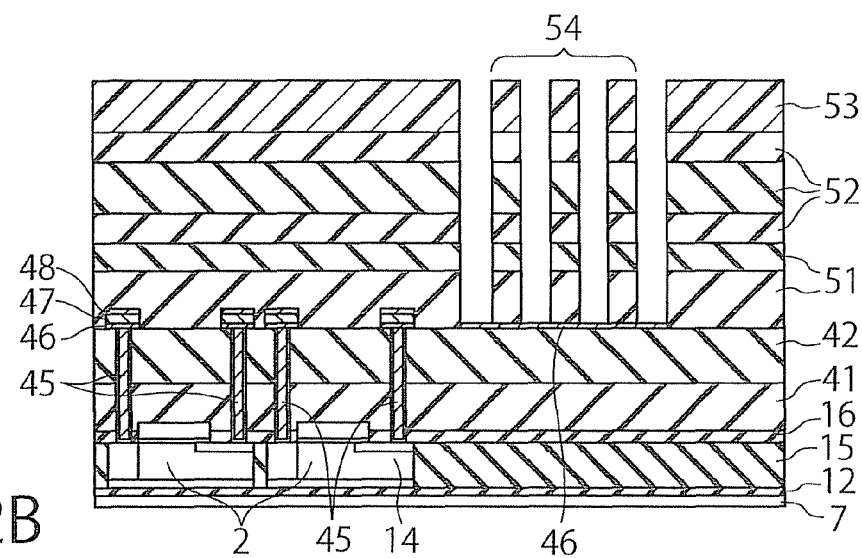

In the procedure illustrated in FIG. 12B, deep trenching is performed by RIE with the use of a lithography technique, to form deep trench openings 54. However, the etching does not reach the lower barrier metal 46 remaining on the TEOS 42 to be the first interlayer insulating film.

Figure 12C:
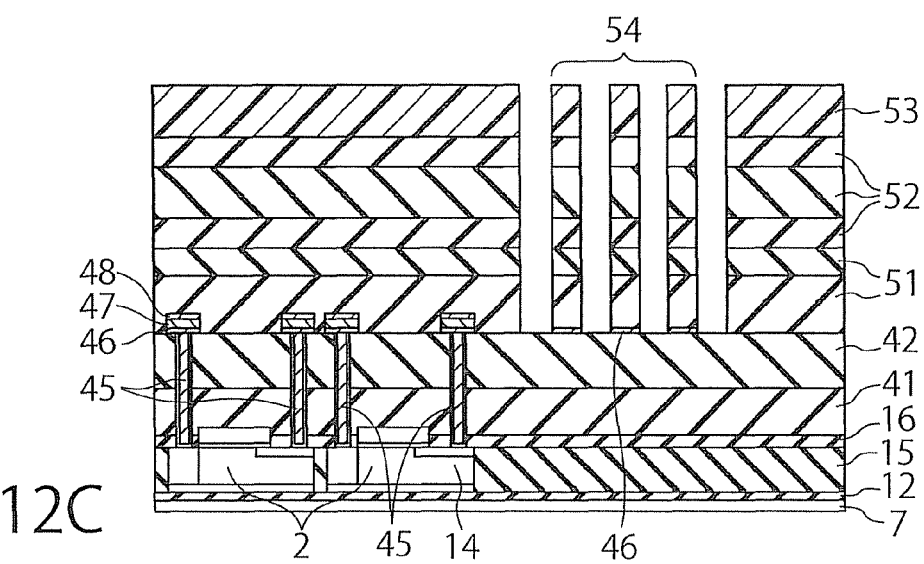

In the procedure illustrated in FIG. 12C, deep trenching by RIE is performed on the lower barrier metal 46 corresponding to the supporting legs 3. However, the etching does not reach the TEOS 42 to be the first interlayer insulating film.

Figure 13A:
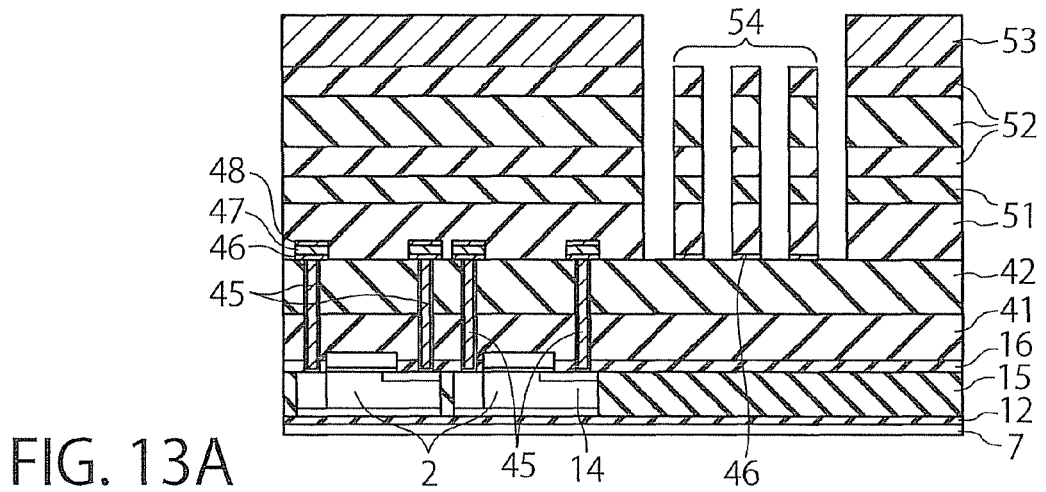
FIGS. 13A through 13C are cross-sectional views illustrating a method of manufacturing the infrared imaging device according to the second embodiment.

In the procedure illustrated in FIG. 13A, the portions of the resist 53 located over the deep trench openings 54 are removed. By removing those portions of the resist 53, etching can be performed on the regions other than the regions corresponding to the supporting legs 3.

Figure 13B:
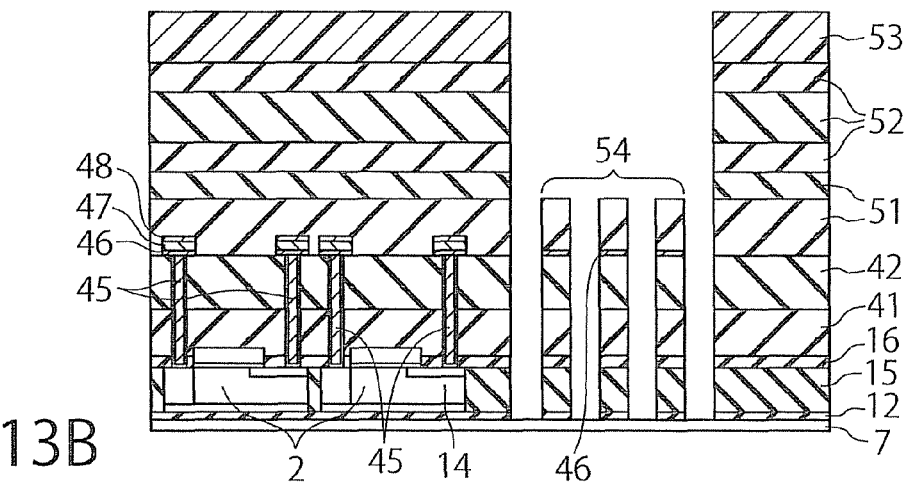

In the procedure illustrated in FIG. 13B, deep trenching by RIE is further performed by a lithography technique, with the resist 53 serving as a mask. By doing so, the deep trench openings 54 are extended to the silicon substrate 7 by the etching. The portions of the TEOS 51 and the TEOS 52 located over the deep trench openings 54 are removed by etchback.

Figure 13C:
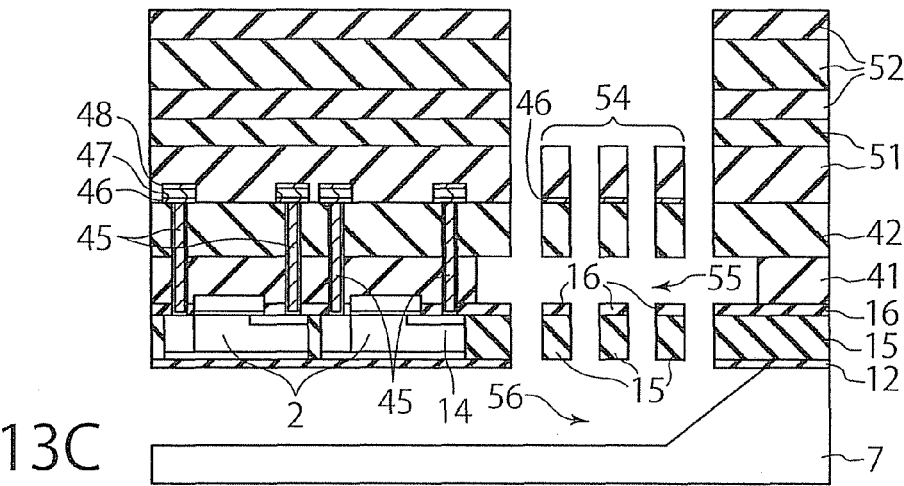

In the procedure illustrated in FIG. 13C, a hollowing process is performed to separate the heat-sensitive diodes 2 from the silicon substrate 7. In this procedure, TMAH is used as the etching solution, as in the first embodiment. TMAH is well known as an etchant for anisotropic etching to be performed on silicon. However, it is known that etching is also performed on BPSG.

There are through holes between the supporting legs 3 in the procedure illustrated in FIG. 13B, and the TMAH moves deeper through the through holes in FIG. 13C. As a result, etching is performed on the silicon substrate 7 below the supporting legs 3, to form a hollow of an inverse-pyramid shape. Normally, TMAH has selectivity for oxide films such as the TEOS films 51 and 42. In this procedure, however, the BPSG 41 as an interlayer insulating film is etched and partially removed. As a result, the end portions of the BPSG 41 are recessed.

In the second embodiment, the TEOS 51, the lower barrier metal 46, and the BPSG 41 that is the layer under the TEOS 42 are partially removed by etching performed in this procedure. Accordingly, a hollow portion 55 is formed between the TEOS 42 of the supporting legs 3 and the barrier film 16. Further, through this procedure, a hollow portion 56 is formed between the silicon substrate 7 and the lower portions of the heat-sensitive diodes 2 and the lower barrier metal 46.

Figure 14:
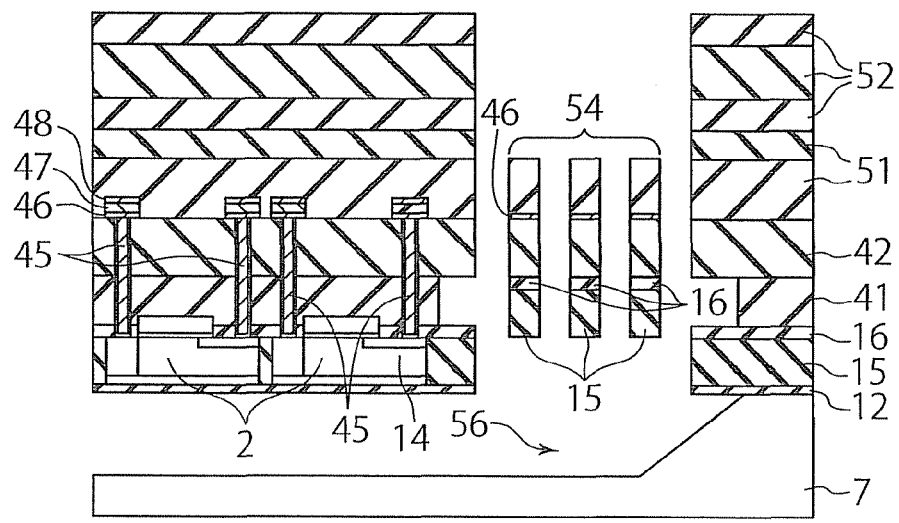
FIG. 14 is a cross-sectional view illustrating a method of manufacturing the infrared imaging device according to the second embodiment.

Lastly, in the procedure illustrated in FIG. 14, a device drying process is performed, and the barrier film 16 and the STI 15 are attracted to the TEOS 42 as the first interlayer insulating film by the stress of the supporting legs 3. The TEOS 42 and the barrier film 16 are bonded to each other. Through this drying process, the hollow portion 55 existing in the procedure illustrated in FIG. 13C disappears.

As shown in FIG. 14, the lower barrier metal 46, the TEOS films 51 and 42 as the interlayer insulating films existing on and under the lower barrier metal 46, and the bonded barrier film 16 and the STI 15 remain to form the supporting legs 3.

As described above, in the second embodiment, the procedures illustrated in FIGS. 9A through 14 are carried out to reduce the cross-sectional area of each supporting leg 3 and lower the heat conductance of each supporting leg 3. Accordingly, the heights of the supporting legs 3 can be reduced by performing etching on the TEOS films 42, 51, and 52 only at the portions corresponding to the supporting legs 3. The TEOS films 42, 51, and 52 serve as the surrounding interlayer insulating films.

Also, in the second embodiment, etchback is performed on the upper portions of the supporting legs 3, to reduce the thickness of each supporting leg 3. Accordingly, the heat conductance can be lowered.

Furthermore, in the second embodiment, only materials that can be processed by a general-purpose CMOS process can be used in removing the lower layer portions of the supporting legs 3. Accordingly, devices with excellent productivity can be provided, without using a specially prepared film.

Furthermore, in the second embodiment, the cross-sectional area corresponding to the layer in which the BPSG 41 is formed disappears beforehand through etching. Accordingly, the thickness of each supporting leg 3 is reduced, and the cross-sectional area of each supporting leg 3 is made smaller. As a result, lower heat conductance can be realized.

Third Embodiment

The following is a description of a third embodiment.

Figure 15:
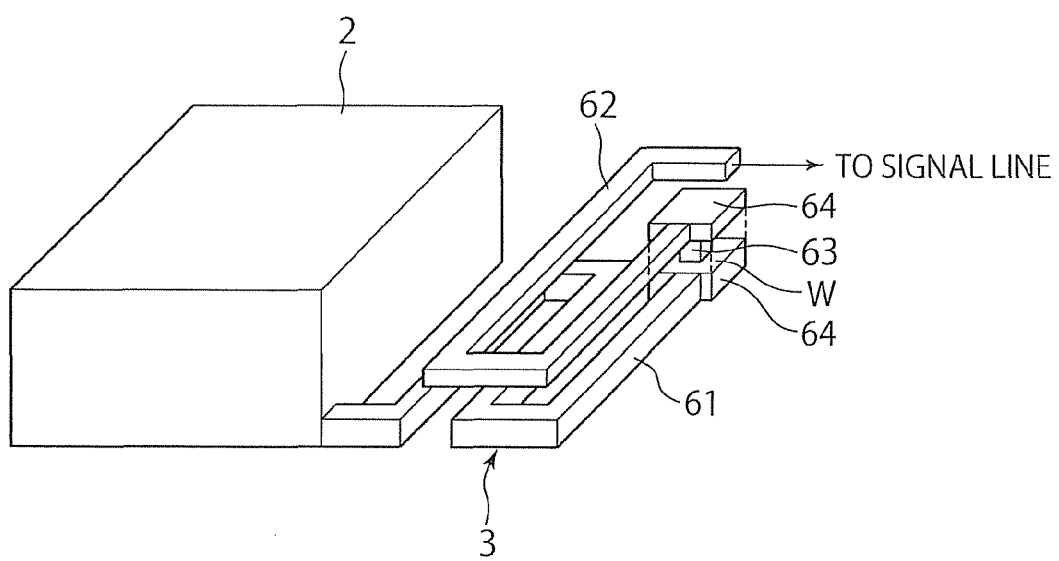
FIG. 15 is a perspective view of an infrared imaging device according to a third embodiment.
Figure 16:
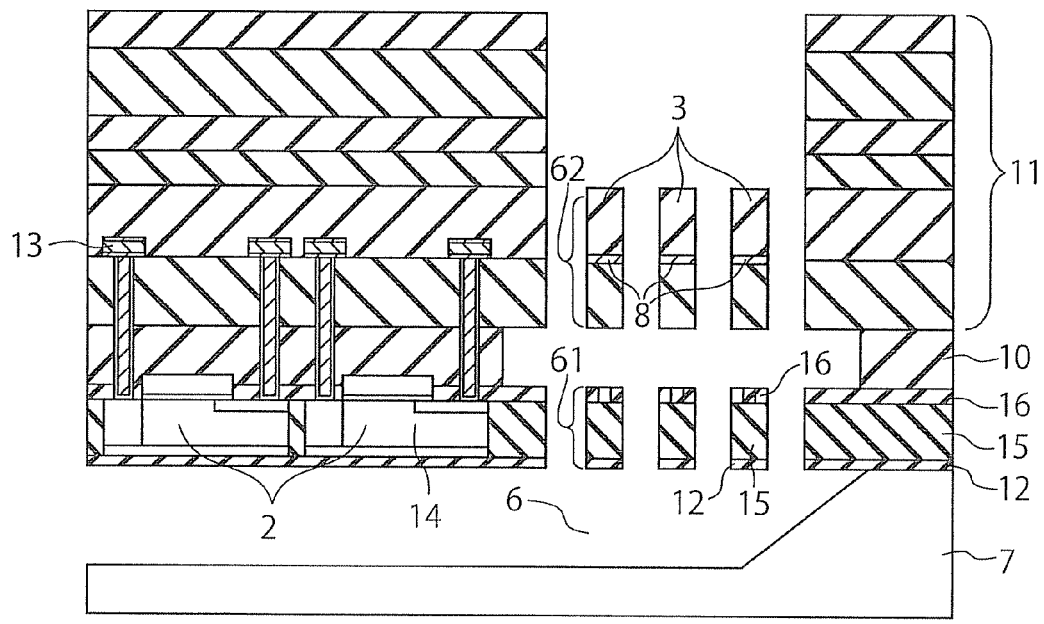
FIG. 16 is a cross-sectional view of the infrared imaging device according to the third embodiment.
Figure 17:
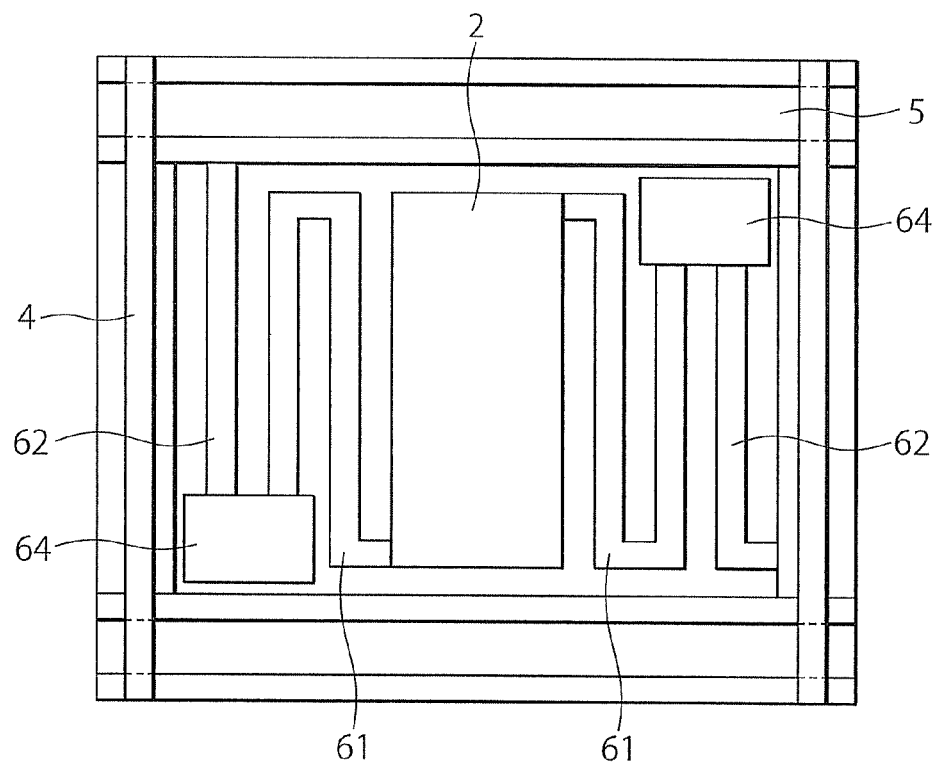
FIG. 17 is a top view of the infrared imaging device according to the third embodiment.

FIG. 15 is a perspective view of an infrared imaging device according to the third embodiment. FIG. 16 is a cross-sectional view of the infrared imaging device according to the third embodiment. FIG. 17 is a top view of the infrared imaging device according to the third embodiment.

As shown in FIG. 15, in the third embodiment, each supporting leg 3 extending from an end portion of a heat-sensitive diode 2 includes a first interconnect layer 61 that is connected to the heat-sensitive diode 2, a second interconnect layer 62 that is located vertically above the first interconnect layer 61, and an interconnect joining portion 63 that joins the first interconnect layer 61 and the second interconnect layer 62.

More specifically, in the third embodiment, each of the supporting legs 3 supporting the heat-sensitive diodes 2 is formed with the two layers of the first interconnect layer 61 and the second interconnect layer 62 facing each other in the vertical direction. As shown in the equation (3), the heat conductance of each supporting leg 3 can be lowered by elongating the supporting leg 3. If each interconnect in each supporting leg 3 is made longer, higher sensitivity can be expected. However, if this is achieved two-dimensionally as in the first and second embodiments, the cell pitch of heat-sensitive diodes 2 adjacent to one another becomes wider. As a result, the chip area becomes larger, and the chip costs become higher. In the third embodiment, on the other hand, each supporting leg 3 is made longer in the vertical direction. Accordingly, the interconnect length of each supporting leg 3 can be made greater, without a change in cell pitch.

The interconnect joining portion 63 is the interlayer insulating film 10 made of BPSG prior to etching. In the later described etching process, not all of the interlayer insulating film 10 is etched, and the portion functioning as the interconnect joining portion 63 is left.

The second interconnect layer 62 is connected to an external signal line, and transmits electrical signals from the heat-sensitive diodes 2 to the external signal line.

An interconnect connecting portion 64 is provided for each of the first and second interconnect layers 61 and 62, and has a larger area than the interconnect joining portion 63. This is to prevent the interlayer insulating film 10 forming the interconnect joining portion 63 joining the first interconnect layer 61 and the second interconnect layer 62 from disappearing when etching is performed on the interlayer insulating film 10 in the later described etching process.

Referring now to the cross-sectional view of the infrared imaging device according to the third embodiment of the present invention illustrated in FIG. 16, the infrared imaging device is described in detail.

As shown in FIG. 16, in the third embodiment, a hollow structure is formed between the silicon substrate 7 and the lower portions of the supporting legs 3 and the heat-sensitive diodes 2, as in the first embodiment, and the hollow portion 6 exists in the hollow structure. The heat-sensitive diodes 2, the SOI 14, and the BOX 12 are placed over the silicon substrate 7 via the hollow portion 6.

Each heat-sensitive diode 2 has a $P^+$-type layer and an $N^-$-type layer formed by ion implantation, and functions as a diode. The BOX 12 is placed under the STI 15 and the heat-sensitive diodes 2.

The STI 15 is stacked on the BOX 12. The barrier film 16 is stacked on the STI 15. Being made of a nitride such as SiN, the barrier film 16 functions as a barrier film when oxygen etching is performed.

An interlayer insulating film 10 is stacked on the barrier film 16, as in the first embodiment. Also, as in the first embodiment, by the later described etching process, the end portions of the interlayer insulating film 10 are etched and recessed in directions away from the supporting legs 3, compared with the end portions of the BOX 12, the STI 15, the barrier film 16, and the interlayer insulating films 11 made of TEOS.

Several layers of the interlayer insulating films 11 are stacked on the interlayer insulating film 10. The Al interconnects 13 are further provided between the upper portions of the heat-sensitive diodes 2 and the interlayer insulating films 11.

As can be seen from FIG. 16, the cross-sectional area of each supporting leg 3 is reduced by providing the hollow portion 6 on and below the upper and lower layers of the portions forming the supporting legs 3. Furthermore, since the end portions of the interlayer insulating film 10 are etched and recessed in directions away from the supporting legs 3, the interlayer insulating film that conventionally functions as a sacrifice layer remains after the etching.

Furthermore, in the third embodiment, each of the supporting leg 3 includes, as described with reference to FIG. 15, the second interconnect layer 62 containing the TEOS films 11 and the electric interconnects 8, and the first interconnect layer 62 containing the STI 15, the BOX 12, the barrier film 16, and Poly-Si interconnects 71. The Poly-Si interconnects 71 function to transmit electrical signals from the heat-sensitive diodes 2 to the electric interconnects 8 in the second interconnect layers 62 via the interconnect joining portions 63. With the connecting relationships, the electrical signals from the heat-sensitive diodes 2 are transmitted through the Poly-Si interconnects 71 in the first interconnect layers 61, and are sent to the electric interconnects 8 in the second interconnect layers 62 of the supporting legs 3 via the interconnect joining portions 63. In this manner, the electrical signals are output to an external signal line.

Referring now to the plan view of the infrared imaging device according to the third embodiment of the present invention illustrated in FIG. 17, the infrared imaging device is further described in detail.

As shown in FIG. 17, the electrical signals from the heat-sensitive diodes 2 pass through the first interconnect layers 61, and are sent to the second interconnect layers 62 via the interconnect joining portions 63 at the interconnect connecting portions 64. The second interconnect layers 62 are connected to the vertical signal lines 4 or the horizontal signal lines 5. With this structure, the electrical signals from the heat-sensitive diodes 2 are transmitted to the vertical signal lines 4 and the horizontal signal lines 5 located outside.

Referring now to FIGS. 18A through 22C, the method of manufacturing the infrared imaging device according to the third embodiment is described.

Figure 18A:
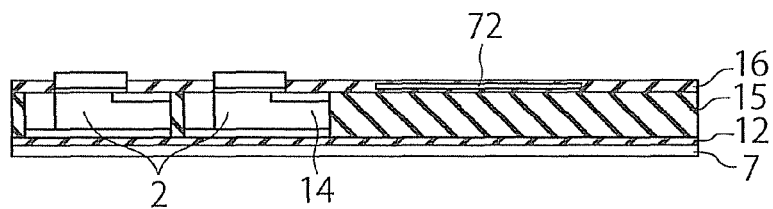
FIGS. 18A through 18E are cross-sectional views illustrating a method of manufacturing the infrared imaging device according to the third embodiment.

FIG. 18A is a cross-sectional view that is seen after a PN junction is formed on each heat-sensitive diode 2 by a general-purpose CMOS process. The BOX 12 is stacked on the Si substrate 7. The heat-sensitive diodes 2, the SOI 14, and the STI 15 are formed over the BOX 12. Further, the barrier film 16 is formed to cover the heat-sensitive diodes 2, the SOI 14, and the STI 15. Here, this embodiment differs from the second embodiment in that Poly-Si 72 is buried in each of the regions corresponding to the supporting legs 3.

Figure 18B:
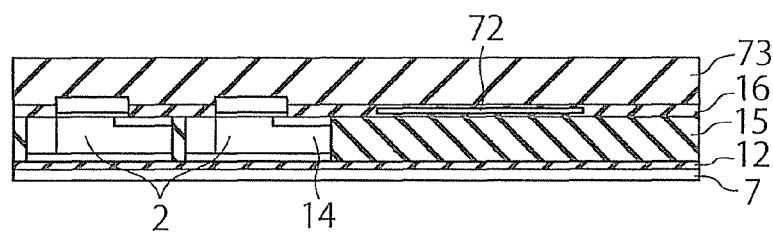

As shown in FIG. 18B, BPSG 73 to be an interlayer insulating film is applied onto the entire surface of the barrier film 16, and is turned into a film. Here, the third embodiment differs from the second embodiment in that, in the procedure for forming the BPSG film 73, the Poly-Si 72 in the regions corresponding to the supporting legs 3 and the BPSG film 73 form interfaces.

Figure 18C:
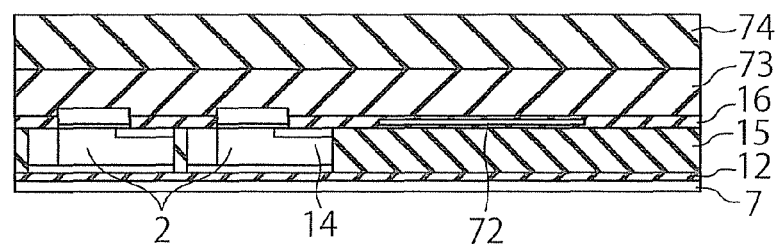

In the procedure illustrated in FIG. 18C, TEOS 74 to be a first interlayer insulating film is stacked on the BPSG 73, and flattening is performed on the surface.

Figure 18D:
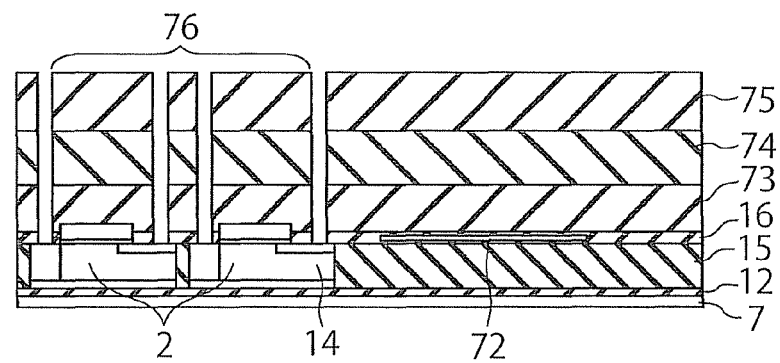

In the procedure illustrated in FIG. 18D, a resist 75 is stacked on the TEOS 74 to be the first interlayer insulating film. After that, etching is performed by a lithography technique. In this manner, the BPSG 73, the TEOS 74, and the resist 75 are removed at the portions corresponding to the Al interconnects 13, to form contact holes 76 that are openings.

Figure 18E:
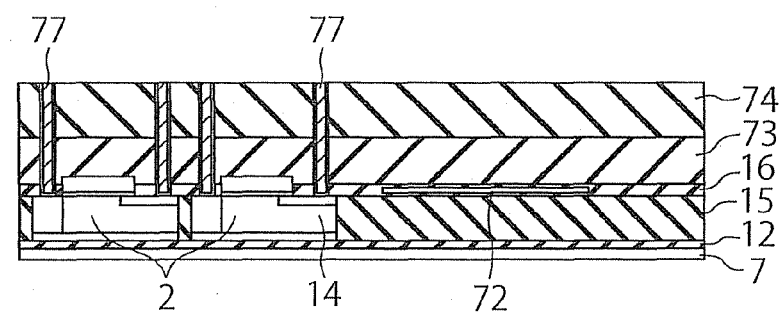

In the procedure illustrated in FIG. 18E, the contact holes 76 that are openings are filled to form contacts 77 (hereinafter equivalent to the Al interconnects 13). Here, Ti, TiN, W, or the like is used as the contacts 77, as in the first embodiment. The contacts 77 are connecting regions that electrically connect multilayer interconnects formed on device regions, to the device regions formed on the SOI 14 by impurity implantation. The contacts 77 serve as contacts with the upper portions of the heat-sensitive diodes 2, and function to transmit electrical signals from the heat-sensitive diodes 2 to the outside.

Figure 19A:
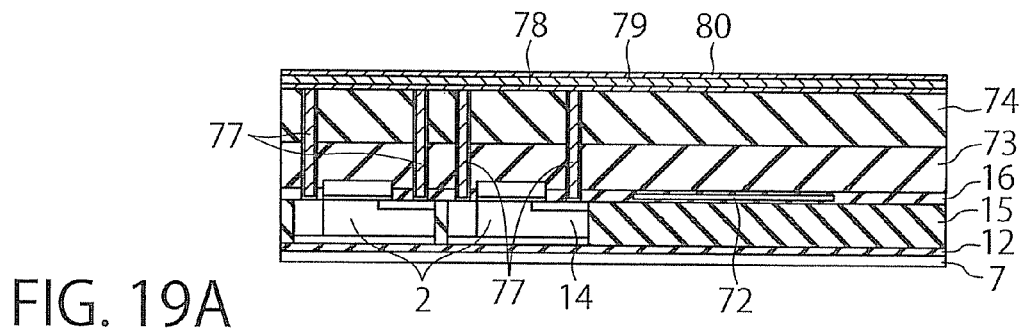
FIGS. 19A through 19D are cross-sectional views illustrating a method of manufacturing the infrared imaging device according to the third embodiment.

In the procedure illustrated in FIG. 19A, a lower barrier metal 78, an interconnect 79, and an upper barrier metal 80 are sequentially stacked. Here, Ti or TiN can be used as the lower barrier metal 78 and the upper barrier metal 80, as in the first embodiment. Meanwhile, Al—Cu may be used as the interconnect 79, as in the first embodiment.

Figure 19B:
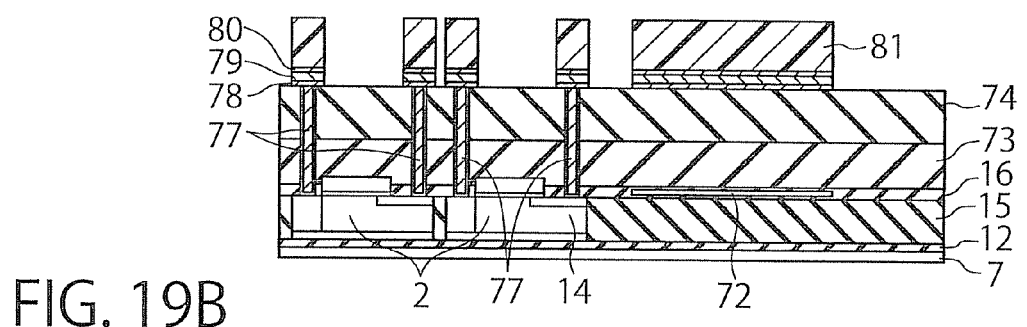

In the procedure illustrated in FIG. 19B, a resist 81 is stacked on the upper barrier metal 80, and etching is performed by a lithography technique, with the resist 81 serving as a mask. In this manner, the upper barrier metal 80, the interconnect 79, and the lower barrier metal 78 are partially removed by the etching. In the etching of the interconnect 79, a Cl-based gas or the like is used.

Figure 19C:
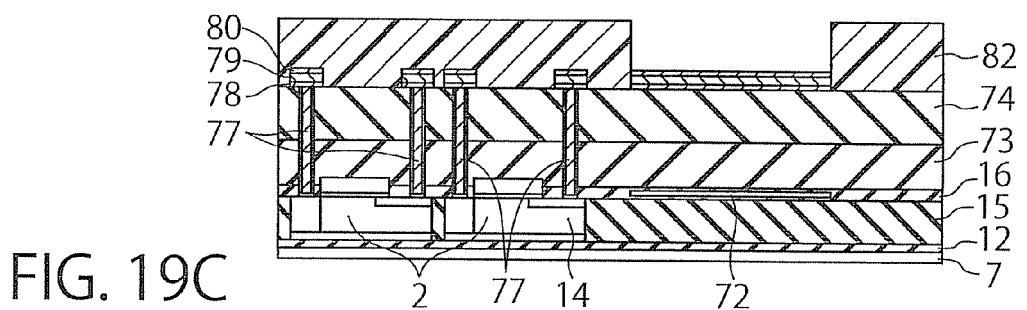

In the procedure illustrated in FIG. 19C, after the resist 81 is removed, a resist 82 is again stacked. The portions of the upper barrier metal 80, the interconnect 79, and the lower barrier metal 78 corresponding to the upper portions of the supporting legs 3 are exposed through the surface, so that the resist 82 is not stacked thereon.

Figure 19D:
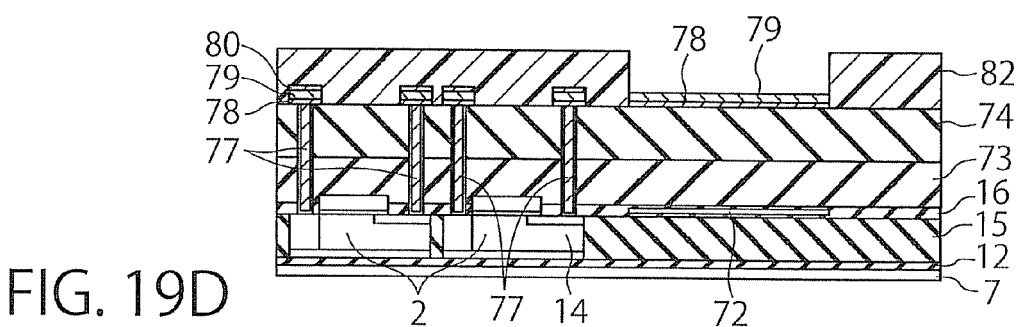

In the procedure illustrated in FIG. 19D, etching is performed by a lithography technique, with the resist 82 serving as a mask. In this manner, the upper barrier metal 80 is removed by the etching. However, the interconnect 79 and the lower barrier metal 78 are not etched, and still remain.

Figure 20A:
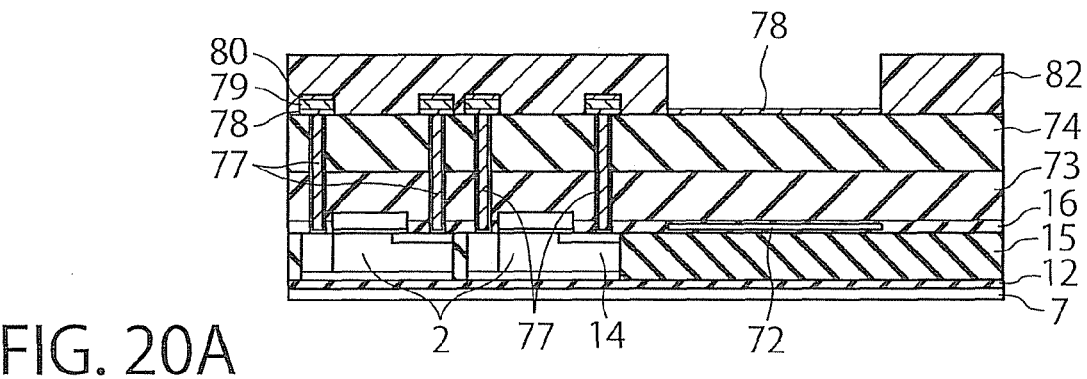
FIGS. 20A through 20C are cross-sectional views illustrating a method of manufacturing the infrared imaging device according to the third embodiment.

In the procedure illustrated in FIG. 20A, etching is performed by a lithography technique, with the resist 82 serving as a mask. In this manner, the interconnect 79 is removed by the etching. However, the lower barrier metal 78 is not etched, and still remains.

The procedures illustrated in FIGS. 19D and 20A are carried out to lower the heat conductance of the interconnects of the supporting legs 3, as in the first embodiment. As explained in conjunction with the equation (3), the heat conductance of the supporting legs 3 can be effectively lowered by using an interconnect material having a low heat conduction coefficient, elongating the supporting legs, and reducing the cross-sectional area of each supporting leg.

In the third embodiment, the electric interconnects 8 are formed with a material having a lower heat conduction coefficient, as in the first embodiment. Accordingly, by performing selective etching on the upper barrier metal 80 formed with Ti or TiN of the interconnect 79 corresponding to the interconnects of the supporting legs 3 and on the interconnect 79 under the upper barrier metal 80, the material forming the electric interconnects 8 can be formed only with the lower barrier metal 78 made of Ti or TiN. In the selective etching of the upper barrier metal 80, heated $H_2O_2$ (hydrogen peroxide solution) or the like can be used. In the selective etching of the interconnect 79, a mixed acid of $CH_3COOH$ (nitric acid), $HNO_3$ (acetic acid), and $H_3PO_4$ (phosphoric acid) can be used.

Figure 20B:
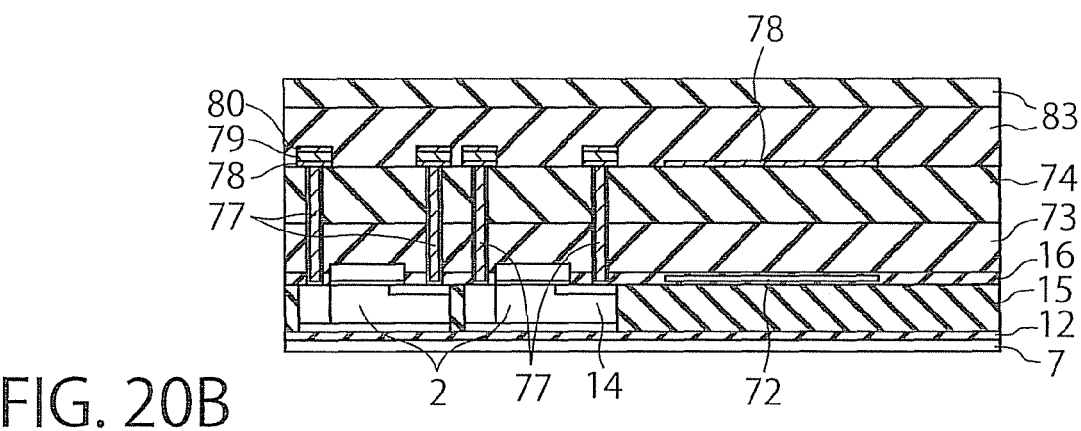

In the procedure illustrated in FIG. 20B, after the resist 82 is removed, two layers of TEOS 83 to be second interlayer insulating films are stacked.

Figure 20C:
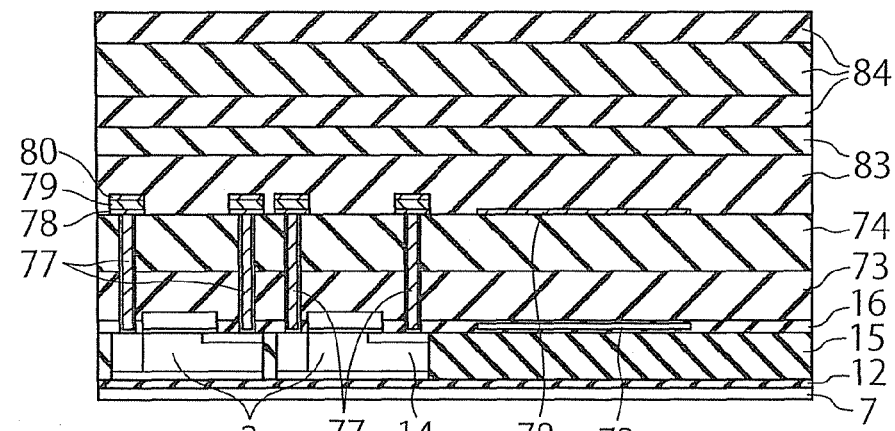

In the procedure illustrated in FIG. 20C, two layers of TEOS 84 to be second interlayer insulating films are further stacked.

Figure 21A:
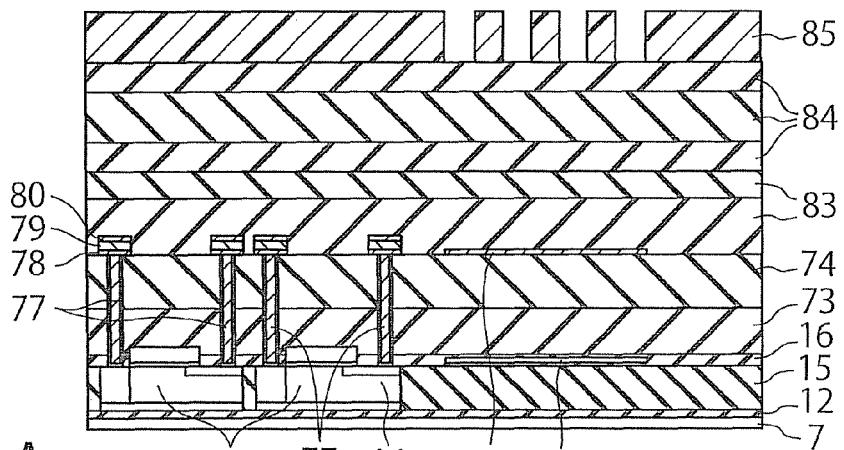
FIGS. 21A through 21C are cross-sectional views illustrating a method of manufacturing the infrared imaging device according to the third embodiment.

In the procedure illustrated in FIG. 21A, a resist 85 is applied to regions other than the regions corresponding to the supporting legs 3 by a lithography technique. By applying the resist 85 in this manner, etching can be performed on the regions corresponding to the supporting legs 3.

Figure 21B:
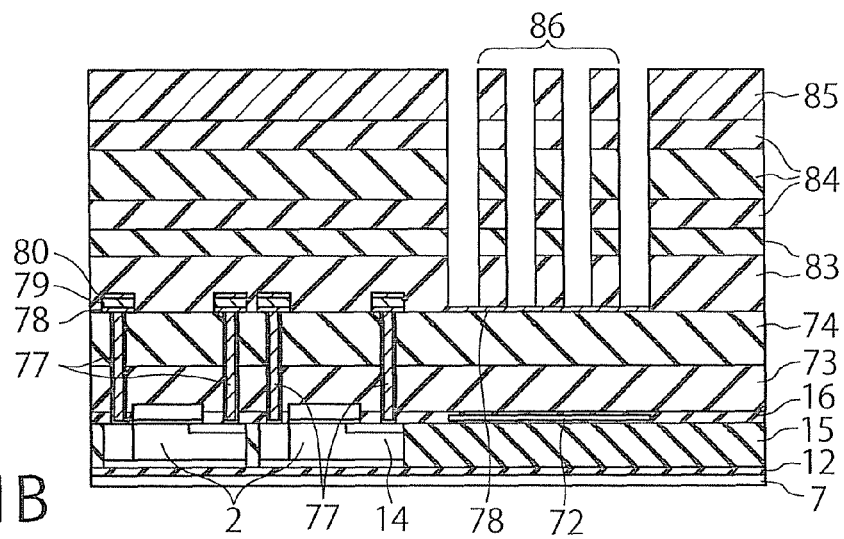

In the procedure illustrated in FIG. 21B, deep trenching is performed by RIE with the use of a lithography technique, to form deep trench openings 86. However, the etching does not reach the lower barrier metal 78 remaining on the TEOS 74 to be the first interlayer insulating film.

Figure 21C:
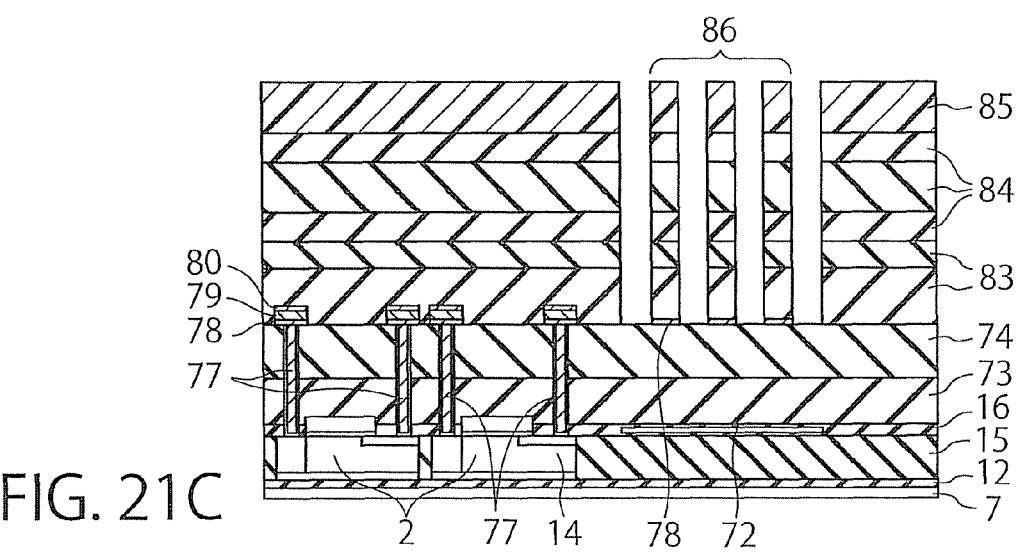

In the procedure illustrated in FIG. 21C, deep trenching by RIE is performed on the lower barrier metal 78 corresponding to the supporting legs 3. However, the etching does not reach the TEOS 74 to be the first interlayer insulating film.

Figure 22A:
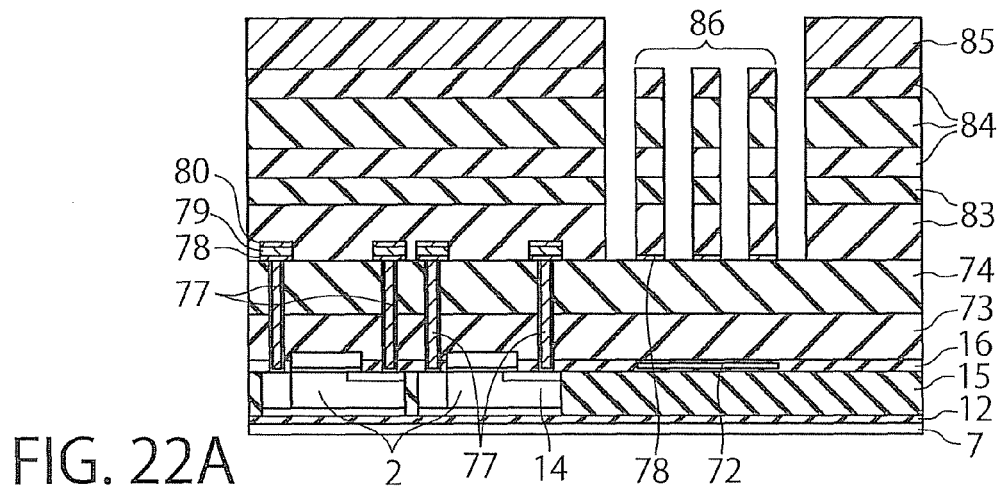
FIGS. 22A through 22C are cross-sectional views illustrating a method of manufacturing the infrared imaging device according to the third embodiment.

In the procedure illustrated in FIG. 22A, the portions of the resist 85 located over the deep trench openings 86 are removed. By removing those portions of the resist 85, etching can be performed on the regions other than the regions corresponding to the supporting legs 3.

Figure 22B:
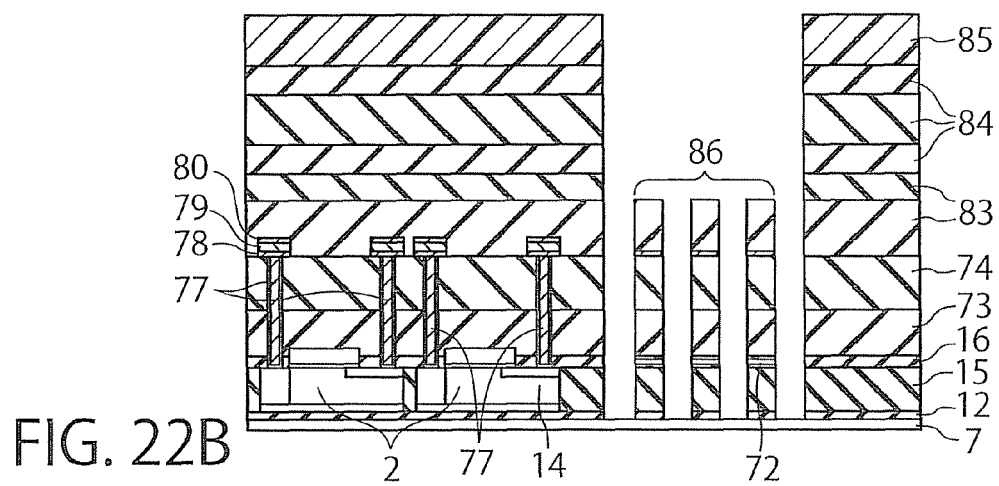

In the procedure illustrated in FIG. 22B, deep trenching by RIE is further performed by a lithography technique, with the resist 85 serving as a mask. By doing so, the deep trench openings 86 are extended to the silicon substrate 7 by the etching. The portions of the TEOS 83 and the TEOS 84 located over the deep trench openings 86 are removed by etchback.

Figure 22C:
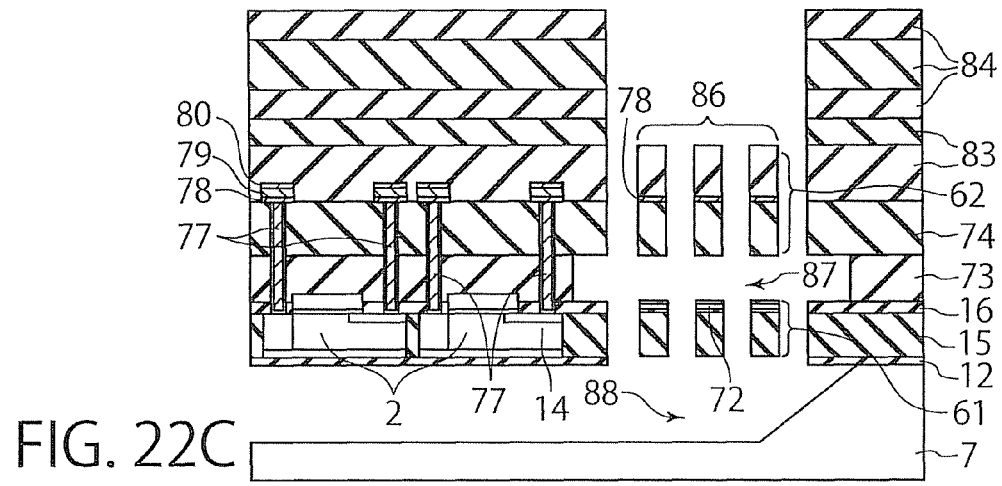

In the procedure illustrated in FIG. 22C, a hollowing process is performed to separate the heat-sensitive diodes 2 from the silicon substrate 7. In this procedure, TMAH is used as the etching solution, as in the first embodiment. TMAH is well known as an etchant for anisotropic etching to be performed on silicon. However, it is known that etching is also performed on BPSG.

There are through holes between the supporting legs 3 in the procedure illustrated in FIG. 22B, and the TMAH moves deeper through the through holes in the procedure illustrated in FIG. 22C. As a result, etching is performed on the silicon substrate 7 below the supporting legs 3, to form a hollow of an inverse-pyramid shape. Normally, TMAH has selectivity for oxide films such as the TEOS films 83 and 74. In this procedure, however, the BPSG 73 as an interlayer insulating film is etched and partially removed. As a result, the end portions of the BPSG 73 are recessed.

In the third embodiment, the TEOS 83 of the second interconnect layer 62, the lower barrier metal 78, and the BPSG 73 that is the layer under the TEOS 74 are partially removed by etching performed in this procedure. Accordingly, a hollow portion is formed between the TEOS 74 forming the second interconnect layers 62 and the barrier film 16 forming the first interconnect layers 61. Further, through this procedure, a hollow portion 88 is formed between the silicon substrate 7 and the lower portions of the heat-sensitive diodes 2 and the lower barrier metal 78.

In the third embodiment, at each interconnect joining portion 63 joining each corresponding first interconnect layer 61 and each corresponding second interconnect layer 62, not all the BPSG 73 between the respective interconnect connecting portions 64 of the first interconnect layer 61 and the second interconnect layer 62 is removed by the procedure illustrated in FIG. 22C, but partially remains, since each of the interconnect connecting portions 64 has a certain size. Therefore, the interconnect joining portions 63 are formed with the BPSG 73 remaining in this procedure, and join the first interconnect layers 61 and the second interconnect layers 62.

As described above, in the third embodiment, the procedures illustrated in FIGS. 18A through 22C are carried out to reduce the cross-sectional area of each supporting leg 3 and lower the heat conductance of each supporting leg 3. Accordingly, the heights of the supporting legs 3 can be reduced by performing etching on the TEOS films 74, 83, and 84 only at the portions corresponding to the supporting legs 3. The TEOS films 74, 83, and 84 serve as the surrounding interlayer insulating films.

Also, in the third embodiment, etchback is performed on the upper portions of the supporting legs 3, to reduce the thickness of each supporting leg 3. Accordingly, the heat conductance can be lowered.

Furthermore, in the third embodiment, only materials that can be processed by a general-purpose CMOS process can be used in removing the lower layer portions of the supporting legs 3. Accordingly, devices with excellent productivity can be provided, without using a specially prepared film.

Furthermore, in the third embodiment, each of the supporting legs 3 supporting the heat-sensitive diodes 2 is formed with the two layers of the first interconnect layer 61 and the second interconnect layer 62 facing each other in the vertical direction. Accordingly, by elongating each supporting leg 3 in the vertical direction, the interconnect length of each supporting leg 3 can be increased without a change in cell pitch.

As described so far, each embodiment of the present invention can provide a high-sensitivity infrared imaging device and a method of manufacturing the infrared imaging device that is smaller in size, realizes a smaller interconnect width for the supporting legs, and maintains high mechanical strength, regardless of mask precision.

The present invention is not limited by the above described embodiments, and various modifications may be made to them.

Specifically, the present invention is not limited by any of the above described embodiments, and modifications may be made to the components in carrying out the invention, without departing from the scope of the invention. Also, the components disclosed in the above embodiments may be combined to form various modifications. For example, some components may be omitted from the components described in the above embodiments. Further, it is possible to combine a component from one of the embodiments and a component from another one of the embodiments.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An infrared imaging device comprising:
an SOI structure that is placed at a distance from a substrate, and includes: heat-sensitive diodes that detect infrared rays and convert the infrared rays into heat; and STI regions that separate the heat-sensitive diodes from one another;
an interlayer insulating film that is stacked on the SOI structure; and
supporting legs that are connected to the heat-sensitive diodes and vertical signal lines provided in outer peripheral regions of the heat-sensitive diodes, each of the supporting legs including:
an interconnect unit that transmit signals to the vertical signal lines;
first and second interlayer insulating layers that sandwich the interconnect unit, the first interlayer insulating layer being below the second interlayer insulating layer, each bottom side of the first and second interlayer insulating layers being located in a higher position than the SOI structure;
a BOX film that is an oxide film and is placed below the first interlayer insulating layer;
STI region that is placed between the first interlayer insulating layer and the BOX film; and
a barrier film that is a nitride film and is placed between the first interlayer insulating layer and the STI region.

2. The device according to claim 1, wherein an upper face of the barrier film is in contact with a lower face of the first interlayer insulating layer, a lower face of the barrier film is in contact with an upper face of the STI region, and a lower face of the STI region is in contact with an upper face of the BOX film.

3. An infrared imaging device comprising:
an SOI structure that is placed at a distance from a substrate, and includes: heat-sensitive diodes that detect infrared rays and convert the infrared rays into heat; and STI regions that separate the heat-sensitive diodes from one another;
a BPSG film that is stacked on the SOI structure;
an interlayer insulating film that is stacked on the BPSG film; and
supporting legs that are connected to the heat-sensitive diodes and vertical signal lines provided in outer peripheral regions of the heat-sensitive diodes, each of the supporting legs including: an interconnect unit that transmit signals to the vertical signal lines; and interlayer insulating layers that sandwich the interconnect unit,
wherein end portions of the BPSG film are recessed in directions away from the supporting legs, compared with end portions of the interlayer insulating layers of the supporting legs, and
wherein each of the supporting legs further includes: a BOX film that is an oxide film; STI regions that separate the heat-sensitive diodes from one another; and a barrier film that is a nitride film.

4. The device according to claim 3, wherein each bottom side of the interlayer insulating layers is located in a higher position than the SOI structure.

5. An infrared imaging device comprising:
an SOI structure that is placed at a distance from a substrate, and includes: heat-sensitive diodes that detect infrared rays and convert the infrared rays into heat; and STI regions that separate the heat-sensitive diodes from one another;
a BPSG film that is stacked on the SOI structure;
an interlayer insulating film that is stacked on the BPSG film; and
supporting legs that are connected to the heat-sensitive diodes and vertical signal lines provided in outer peripheral regions of the heat-sensitive diodes, each of the supporting legs including: an interconnect unit that transmit signals to the vertical signal lines; and interlayer insulating layers that sandwich the interconnect unit,
wherein end portions of the BPSG film are recessed in directions away from the supporting legs, compared with end portions of the interlayer insulating layers of the supporting legs, and
wherein each of the supporting legs includes:
a first interconnect layer that includes: a barrier film that is a nitride film, a first interconnect that is provided in the barrier film, the STI regions, and a BOX film that is an oxide film;
a second interconnect layer that is placed above the first interconnect layer, and includes: the interlayer insulating layer; and a second interconnect that transmits signals to the signal lines; and
an interconnect joining portion that joins the first interconnect of the first interconnect layer and the second interconnect of the second interconnect layer.

6. The device according to claim 5, wherein each bottom side of the interlayer insulating layers is located in a higher position than the SOI structure.

* * * * *